(12) United States Patent
Posner et al.

(10) Patent No.: US 10,354,406 B2
(45) Date of Patent: Jul. 16, 2019

(54) METHOD OF DETECTING OBJECTS WITHIN A 3D ENVIRONMENT

(71) Applicant: Oxford University Innovation Limited, Botley, Oxford (GB)

(72) Inventors: Ingmar Posner, Botley (GB); Zeng Wang, Botley (GB)

(73) Assignee: Oxford University Innovation Limited, Botley, Oxford (GB)

( * ) Notice: Subject to any disclaimer, the term of this patent is extended or adjusted under 35 U.S.C. 154(b) by 0 days.

(21) Appl. No.: 15/568,728

(22) PCT Filed: Apr. 21, 2016

(86) PCT No.: PCT/GB2016/051099
§ 371 (c)(1),
(2) Date: Oct. 23, 2017

(87) PCT Pub. No.: WO2016/170333
PCT Pub. Date: Oct. 27, 2016

(65) Prior Publication Data
US 2018/0144496 A1    May 24, 2018

(30) Foreign Application Priority Data

Apr. 24, 2015    (GB) .................................. 1507016.2

(51) Int. Cl.
*G06T 7/73*    (2017.01)
*G06K 9/00*    (2006.01)
*G06K 9/62*    (2006.01)

(52) U.S. Cl.
CPC ............ *G06T 7/73* (2017.01); *G06K 9/00214* (2013.01); *G06K 9/6203* (2013.01);
(Continued)

(58) Field of Classification Search
CPC ............. G06T 7/73; G06T 2207/10028; G06T 2207/20081; G06T 2207/30252; G06K 9/00214; G06K 9/00288; G06K 9/6203
(Continued)

(56) References Cited

U.S. PATENT DOCUMENTS 9,245,170 B1 *   1/2016   Nikic ...................... G01S 17/89
9,846,946 B2 *  12/2017   Fan ..................... G06K 9/00201
(Continued)

OTHER PUBLICATIONS

Bishop, "Pattern Recognition and Machine Learning", Information Science and Statistics Series, Springer, Chapter 7, 2006.
(Continued)

*Primary Examiner* — Daniel G Mariam
(74) *Attorney, Agent, or Firm* — Knobe, Martens, Olson & Bear, LLP

(57) ABSTRACT

A method and system for detecting objects within a three-dimensional (3D) environment, comprising obtaining a 3D point-cloud representation of the environment, the point-cloud comprising a set of point locations, and converting the point-cloud to a 3D feature grid, wherein converting the point-cloud to the 3D feature grid comprises discretizing the 3D space into cells according to a grid size; determining which cells contain points from the 3D point-cloud; and mapping any that do to a feature vector; and mapping any that do not to a zero feature vector. The method further comprises generating a detection window sized to contain an integral number of the cells and having a set of positions which can be occupied; calculating a detection score for each of the positions by: casting a vote for each cell within the detection window into which at least one point falls, wherein each vote is calculated using the feature vector of the cell and a weighting vector; and summing the votes, and determining whether each position contains an object of interest based on the detection score, each detection window (Continued)

with a detection score greater than a threshold being classified as containing an object of interest.

20 Claims, 17 Drawing Sheets

(52) U.S. Cl.
CPC ............... *G06T 2207/10028* (2013.01); *G06T 2207/20081* (2013.01); *G06T 2207/30252* (2013.01)

(58) Field of Classification Search
USPC ........................................................ 382/154
See application file for complete search history.

(56) References Cited

U.S. PATENT DOCUMENTS

| | | |
|---|---|---|
| 9,864,927 B2 | 1/2018 | McManus et al. |
| 10,109,104 B2 | 10/2018 | Newman et al. |
| 2017/0076455 A1 | 3/2017 | Newman et al. |

OTHER PUBLICATIONS

Dalal et al., "Histograms of oriented gradients for human detection", Computer Vision and Pattern Recognition, 2005, IEEE Computer Society Conference, vol. 1, pp. 886-893.

Dubout et al., "Exact Acceleration of Linear Object Detectors", Proceedings of the European Conference on Computer Vision (ECCV), 2012, pp. 301-311.

Fan et al., "LIBLINEAR: A Library for Large Linear Classification", J. Mach. Learn. Res., 2008, vol. 9, pp. 1871-1874.

Felzenszwalb et al., "Object Detection with Disciminatively Trained Part-Based Models", Pattern Analysis and Machine Intelligence, IEEE Transactions, 2010, vol. 32, No. 9, pp. 1627-1645.

Fidler et al., "3D Object Detection and Viewpoint Estimation with a Deformable 3D Cuboid Model", Advances in Neural Information Processing Systems 25, 2012, pp. 611-619.

Geiger et al., "Vision meets robotics: The KITTI dataset", The International Journal of Robotics Research, 2013, vol. 32, No. 11, pp. 1231-1237.

Gottschalk, "Collision Queries Using Oriented Bounding Boxes", Ph.D. Thesis, The University of North Carolina at Chapel Hill, 2000.

Hedau et al., "Thinking Inside the Box: Using Appearance Models and Context Based on Room Geometry", Proceedings of the 1tth European Conference on Computer Vision: Part VI, 2010, pp. 224-237.

Lai et al., "A large-scale hierarchical multi-view RGB-D object dataset", Robotics and Automation (ICRA), 2011 IEEE International Conference, pp. 1817-1824.

Lehmann et al., "Fast PRISM: Branch and Bound Hough Transform for Object Class Detection", International Journal of Computer Vision, 2011, vol. 94, No. 2, pp. 175-197.

Neubeck et al., "Efficient Non-Maximum Suppression", Pattern Recognition, 2006, vol. 3, pp. 850-855.

Oliveira et al., "Pedestrian detection based on LIDAR-driven sliding window and relational parts-based detection", Intelligent Vehicles Symposium (IV), 2013 IEEE, pp. 328-333.

Oliveira et al., "Semantic fusion of laser and vision in pedestrian detection", Pattern Recognition, 2010, vol. 43, No. 10, pp. 3648-3659.

Premebida et al., "Pedestrian Detection Combining RGB and Dense LIDAR Data", IROS, 2014.

Quigley et al., "High-accuracy 3D sensing for mobile manipulation: Improving object detectin and door opening", Robotics and Automation (ICRA), 2009, IEEE International Conference, pp. 2816-2822.

Sung et al., "Example-Based Learning for View-Based Human Face Detection", IEEE Trans. Pattern Anal. Mach. Intell., 1998, vol. 20, No. 1, pp. 39-51.

Wang et al., "What could move? Finding cars, pedestrians and bicyclists in 3D laser data", IEEE Int Conf on Robotics and Automation (ICRA), May 14, 2012, pp. 4038-4044.

Wang et al., "Voting for Voting in Online Point Cloud Object Detection", Robotics: Science and Systems XI, Jul. 13, 2015.

The KITTI Vision Benchmark Suite, available from http://www.cvlibs.net/datasets/kitti/eval_object.php, downloaded Oct. 20, 2017 in 18 pages.

Velodyne LiDAR, HDL-64E, available from http://www.velodynelidar.com/lidar/hdlproducts/hdl64e.aspx, downloaded Oct. 20, 2017 in 3 pages.

International Search Report issued in PCT Application No. PCT/GB2016/051099, dated Jul. 1, 2016, in 4 pages.

Search Report issued in GB Application No. GB1507016.2, dated Oct. 19, 2015, in 4 pages.

Examination Report issued in GB Application No. GB1507016.2, dated Feb. 17, 2017, in 2 pages.

\* cited by examiner

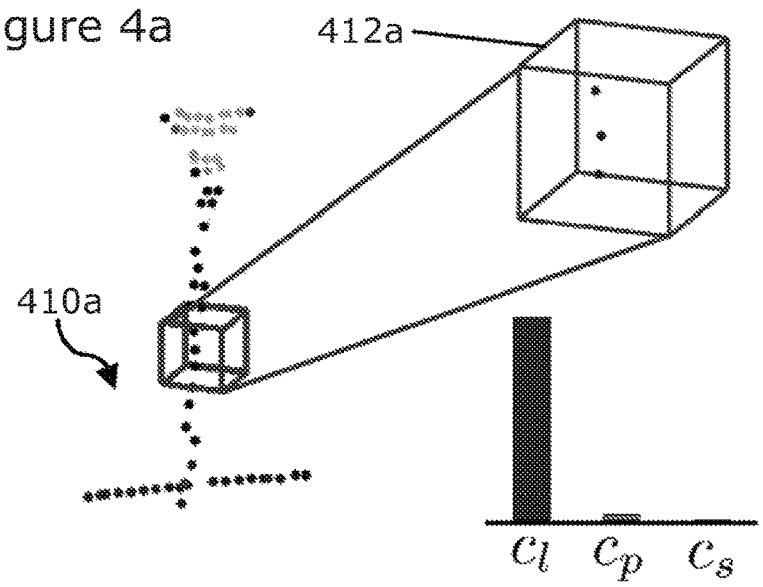
(a)
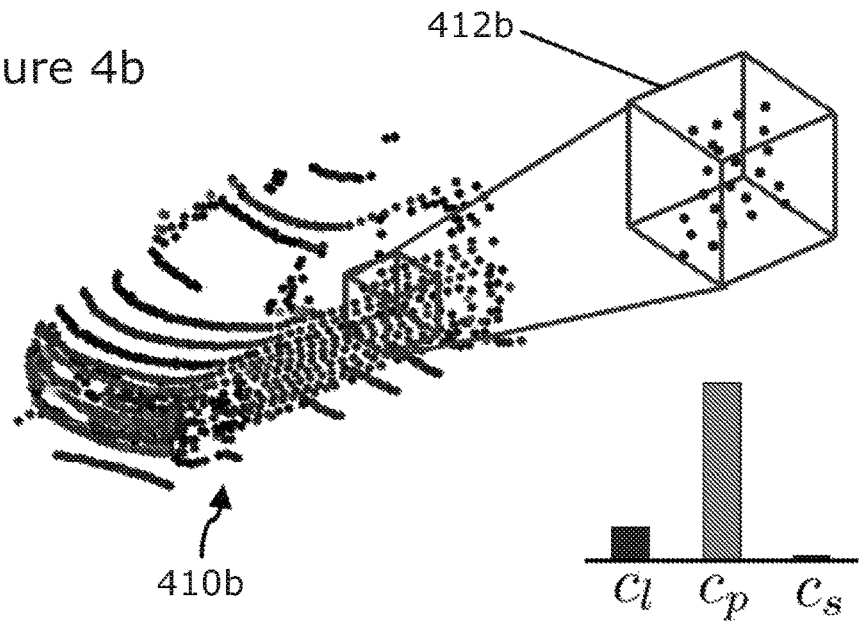
(b)

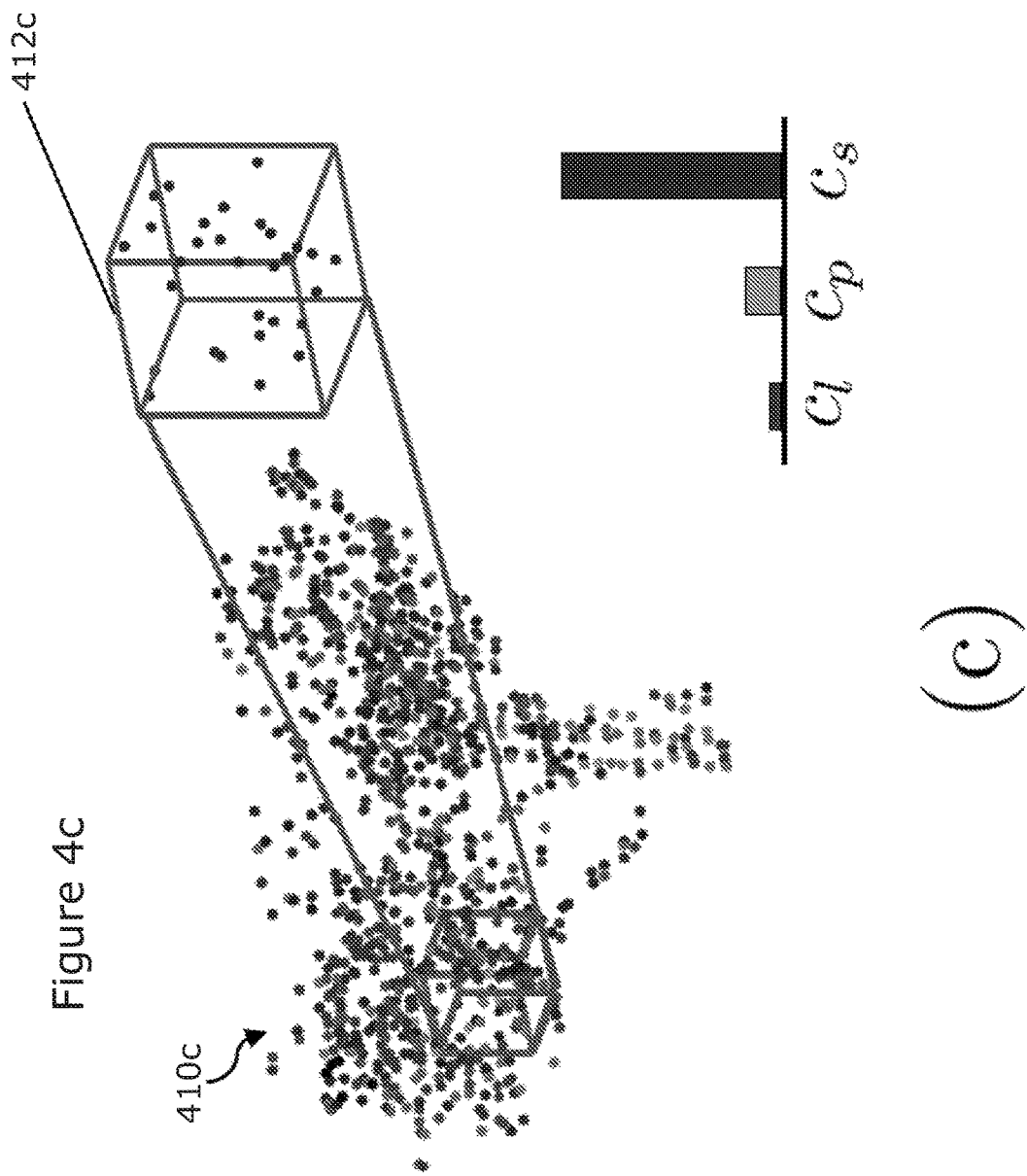

Figure 7b
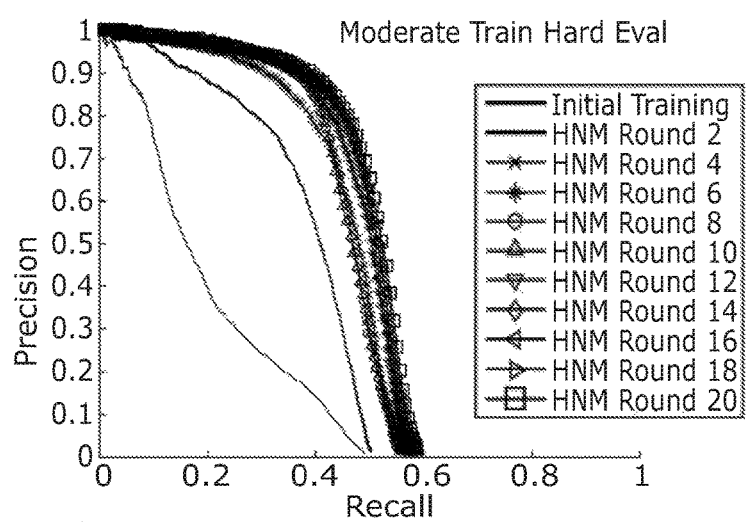
702b
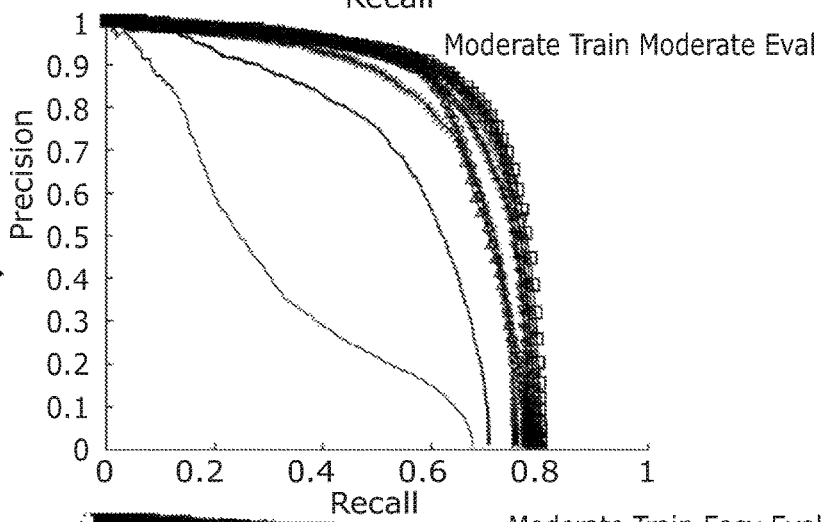
704b
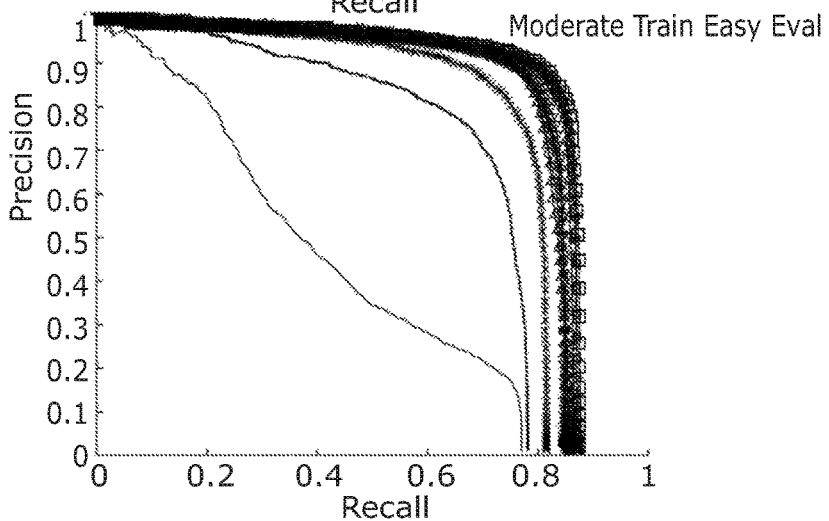
706b

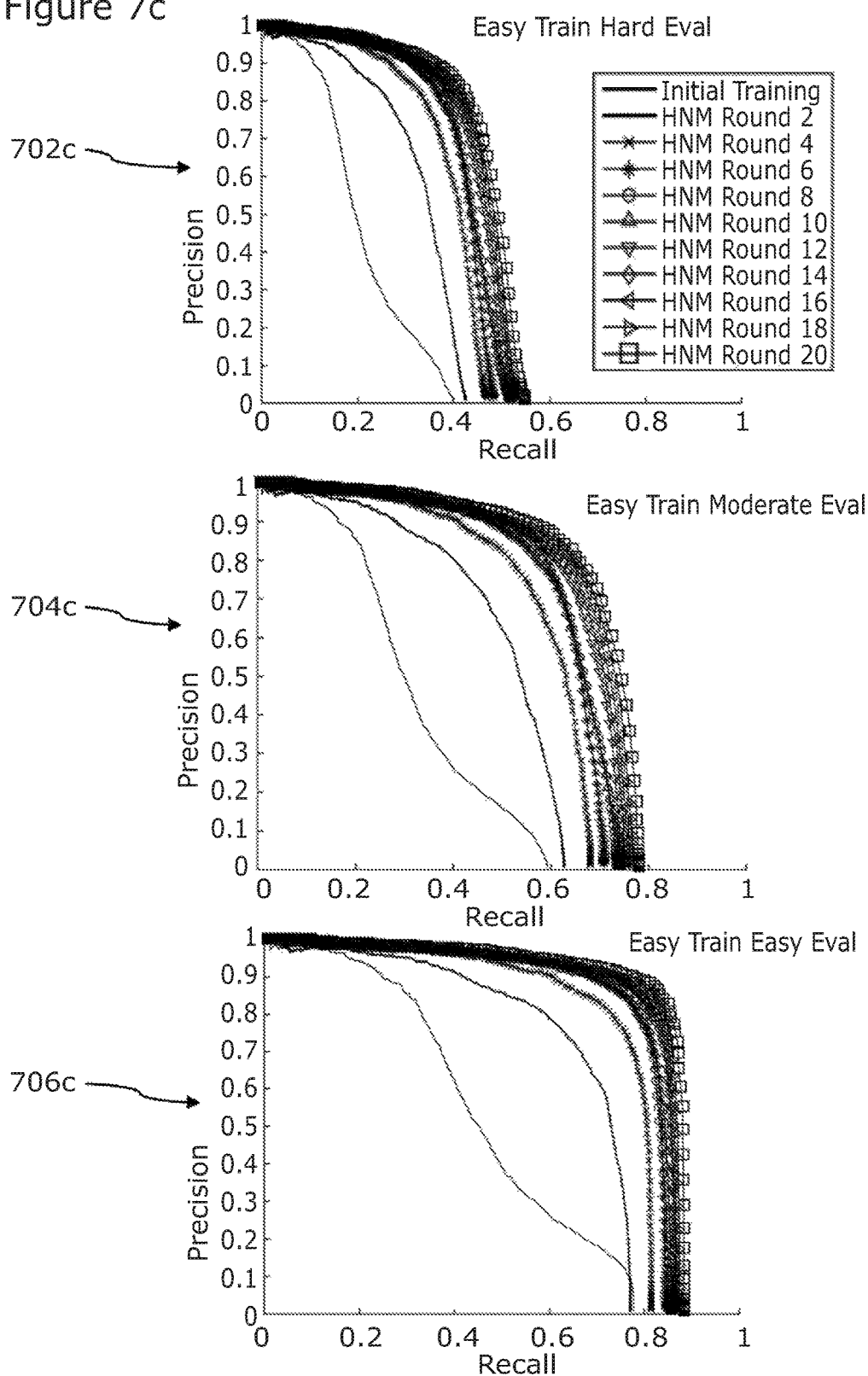

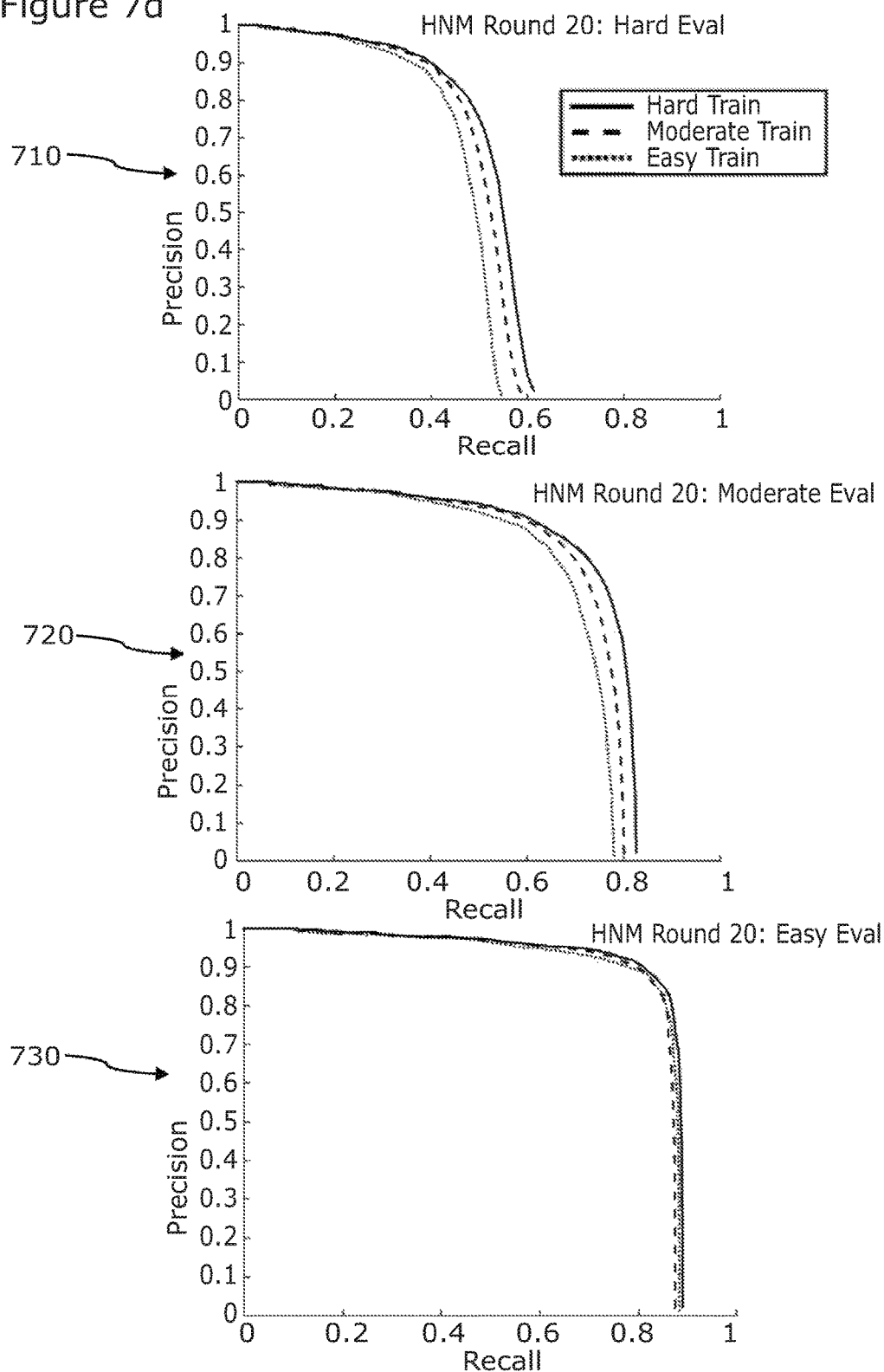

Figure 9
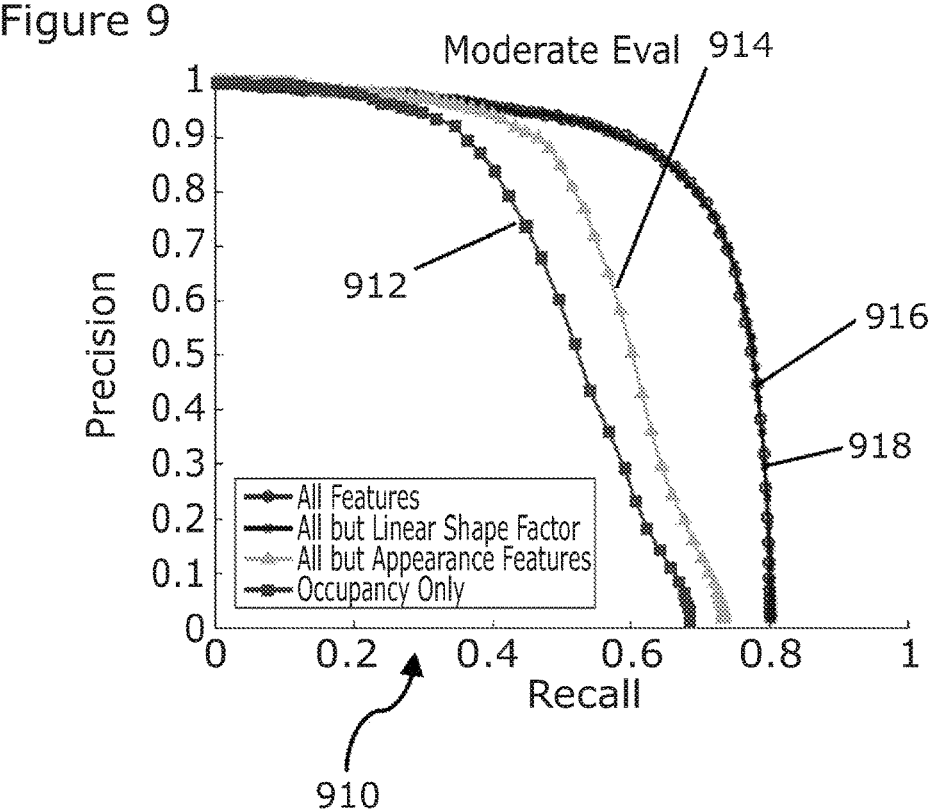
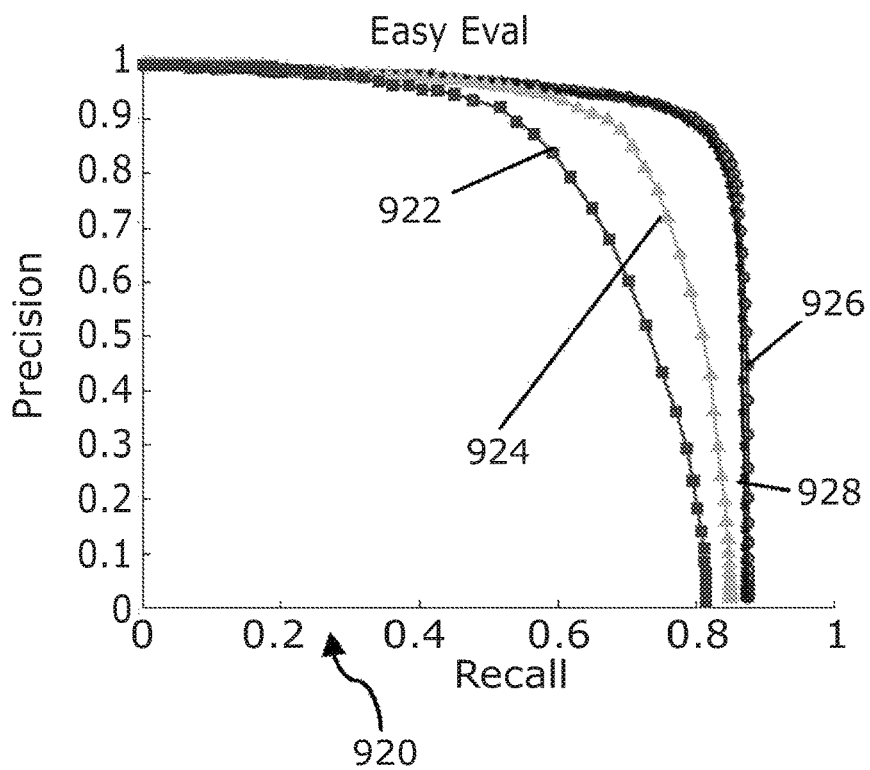

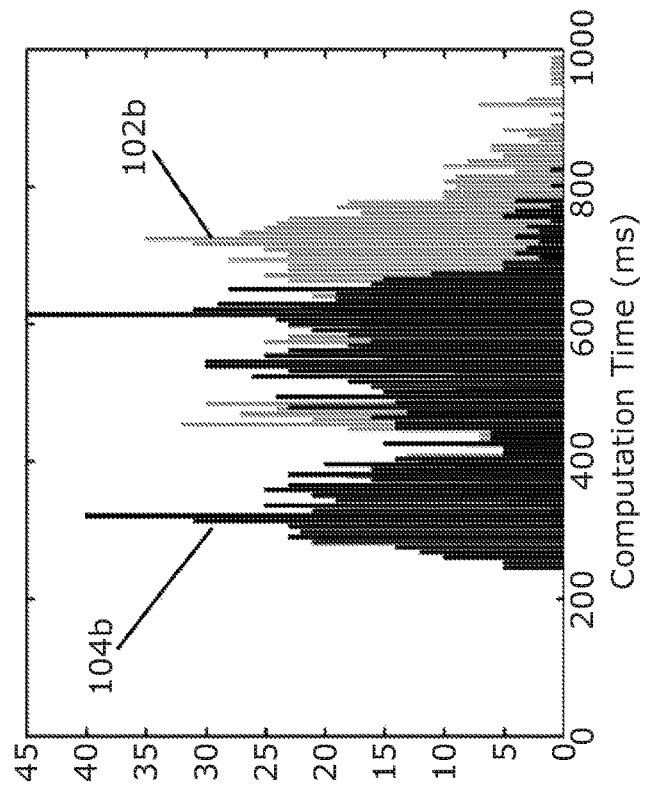
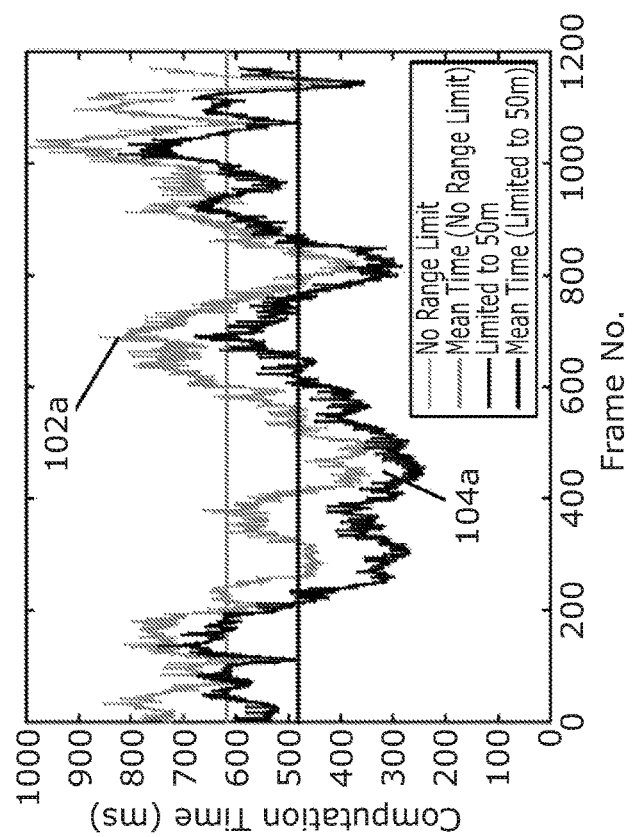
Figure 10a
Figure 10b

METHOD OF DETECTING OBJECTS WITHIN A 3D ENVIRONMENT

This invention relates to a method and system for detecting objects within a 3D environment. In particular, but not exclusively, the invention may exploit the sparsity of 3D point clouds, wherein most space is unoccupied. Further, and again not exclusively, the system or method may be used for 3D laser-based object recognition.

The sliding window approach to object detection is arguably the most frequently deployed paradigm for object detection in two dimensional (2D) images in the Computer Vision community. However, it has been largely neglected for laser-based object recognition, despite sliding windows being equally applicable to a 3D point cloud as to a 2D image. The worry of the extra computational burden introduced by the additional dimension has led to sliding window approaches being dismissed as intractable in 3D.

Current state of the art methods use 3D pose estimation (see, for example, S. Fidler, S. Dickinson, and R. Urtasun, "3D Object Detection and Viewpoint Estimation with a Deformable 3D Cuboid Model", in Advances in Neural Information Processing Systems 25, pages 611-619. Curran Associates, Inc., 2012, and V. Hedau, D. Hoiem, and D. Forsyth. "Thinking Inside the Box: Using Appearance Models and Context Based on Room Geometry", in Proceedings of the 11th European Conference on Computer Vision: Part VI, pages 224-237, Berlin, 2010). Objects are characterised by 3D bounding boxes, and the window/bounding box location is slid in 3D. However, instead of building a 3D feature grid, detection is achieved by projecting the image fronto-parallel to each visible face of the object bounding box and 2D features are then extracted for that face from the projected image.

A line of works by Oliveira and colleagues slides a window in 3D to aid image-based pedestrian detection (see L. Oliveira and U. Nunes, "Pedestrian detection based on LIDAR-driven sliding window and relational parts-based detection", in Intelligent Vehicles Symposium (IV), 2013 IEEE, pages 328-333, and L. Oliveira, U. Nunes, P. Peixoto, M. Silva, and F. Moita, "Semantic fusion of laser and vision in pedestrian detection", Pattern Recognition, 43(10), pages 3648-3659, 2010). From the mounting position of their 2D laser scanner, the location of the ground plane can be estimated to be at a fixed height below the laser and parallel to the laser scanning plane. Then a 2D window of a fixed size fronto-parallel to the camera imaging plane is anchored on the ground plane in 3D and slid through discrete locations on the ground plane. The window at each location is then back-projected into the image plane to bound a pedestrian hypothesis.

An alternative approach to object detection in 3D is to combine a 3D point-cloud acquired with a laser scanner with an image taken by a camera, and project all laser points to the image plane to form a depth image (see, for example, C. Premebida, J. Carreira, J. Batista, and U. Nunes, "Pedestrian Detection Combining RGB and Dense LIDAR Data", in IROS, 2014, M. Quigley, S. Batra, S. Gould, E. Klingbeil, Q. Le, A. Wellman, and A. Ng, "High-accuracy 3D sensing for mobile manipulation: Improving object detection and door opening", in Robotics and Automation (ICRA), 2009, IEEE International Conference, pages 2816-2822, and K. Lai, L. Bo, X. Ren, and D. Fox, "A large-scale hierarchical multi-view RGB-D object dataset", in Robotics and Automation (ICRA), 2011 IEEE International Conference, pages 1817-1824). Then the sliding window approach is applied on both the ordinary image and the depth image in 2D.

Lehmann et al. (A. Lehmann, B. Leibe, and L. Van Gool, "Fast PRISM: Branch and Bound Hough Transform for Object Class Detection", International Journal of Computer Vision, 94(2), pages 175-197, 2011) justify their voting process in the Implicit Shape Model (ISM). In their 2D framework, named Principled Implicit Shape Model (PRISM).

In "What Could Move? Finding Cars, Pedestrians and Bicyclists in 3D Laser Data", in Proc. IEEE International Conference on Robotics and Automation, Minnesota, USA, 2012, D. Z. Wang, I. Posner, and P. Newman proposed segmentation to identify objects of interest that could move from 3D laser scans of urban scenes by solving a binary classification task (ie separating the data into foreground and background before other analysis) and exploring the use of a Euclidean Minimum Spanning Tree for an end-to-end segmentation pipeline. An aim of this work is to provide the layout of an end-to-end pipeline which, when fed by a raw stream of 3D data, produces distinct groups of points which can be fed to downstream classifiers for categorisation.

C. Dubout and F. Fleuret, "Exact Acceleration of Linear Object Detectors", In Proceedings of the European Conference on Computer Vision (ECCV), pages 301-311, 2012) discusses convolution and sliding window detection.

The invention is described in relation to vehicle recognition; the skilled person would understand that the invention can be employed to detect other classes of object, such as pedestrians or buildings, depending on the training data chosen.

According to a first aspect of the invention, there is provided a method of detecting objects within a three-dimensional (3D) environment. The method may comprise at least one of the following steps:

(a) obtaining a 3D point-cloud representation of the 3D environment, the 3D point-cloud comprising a set of point locations;

(b) converting the 3D point-cloud to a 3D feature grid, wherein converting the 3D point-cloud to the 3D feature grid comprises:
  i) discretising the 3D space into cells according to a grid size;
  ii) making a determination as to whether the cells contain points from the 3D point-cloud, and may be whether the cells do not contain points from the 3D point-cloud;
  iii) for each cell into which at least one point from the 3D point-cloud falls, mapping the at least one point to a feature vector; and
  iv) for each cell into which no points from the 3D point-cloud fall, mapping the cell to a zero feature vector;

(c) generating a detection window sized to contain an integral number of the cells of the 3D feature grid and having a set of positions which can be occupied within the 3D feature grid;

(d) calculating, for each of the positions within the set of positions, a detection score, by:
  casting a vote for each cell within the 3D detection window into which at least one point from the 3D point-cloud falls, wherein each vote is calculated using the feature vector of the cell and a weighting vector; and
  summing the votes; and (e) determining whether each position within the set of positions contains an object of interest based on the detection score, wherein each detection window with a detection score greater than a threshold is classified as containing an object of interest.

The skilled person would understand that the steps (a) to (e) may be performed in a different order from that shown, and that some of the steps may be performed in parallel (concurrently).

In some embodiments, some of steps (i), (ii), (iii) and (iv) may be performed concurrently and/or in a different order from that shown.

Optionally, the weighting vector may be obtained from a linear classifier. The linear classifier may have been trained to identify the objects of interest.

In additional or alternative embodiments, the feature vector may be a fixed-dimensional feature vector.

In some embodiments, a vote for a cell may be calculated as the scalar product of the feature vector of that cell and the weighting vector.

In additional or alternative embodiments, the method may further comprise compiling a set of accepted detection window locations from the detection windows calculated to contain an object of interest. The skilled person would understand that the detection scores and/or overlap of the detection windows, or the like, may be used in determining which detection windows to accept.

Optionally, the method may comprise discretising the full 360° of the 3D environment around the vertical axis into N orientation bins. The skilled person would understand that the point-cloud may then be rotated for each orientation bin. Optionally, the detection process can be implemented for some or all of the orientation bins.

In embodiments wherein the 360° of the 3D environment around the vertical axis is discretised into N orientation bins, the detection process for each of the N orientation bins may be performed in one of the following ways, or the like:
  (i) sequentially by angle;
  (ii) sequentially in any order; and/or
  (iii) concurrently.

In some embodiments, the method may comprise selecting a size for the 3D detection window based on a known scale of objects of interest. For example, if an object of interest is a car, the 3D detection window may be sized to correspond to the approximate dimensions of a car. The skilled person would understand that the sizing of the detection window can be based on any object of interest.

In additional or alternative embodiments, the 3D point-cloud may further comprise at least one of the following pieces of information, or the like, for each point:
  (i) a reflectance value; and
  (ii) colour information.

In additional or alternative embodiments, the method may further comprise generating the 3D point cloud. The skilled person would understand that many different methods for generating a 3D point cloud are available, and that any such method could be used. For example, a LIDAR system may be used.

According to a second aspect of the invention, there is provided a system for detecting objects within a three-dimensional (3D) environment. The system may comprise processing circuitry arranged to perform at least one of the steps listed below:
  (a) obtain a 3D point-cloud representation of the 3D environment, the 3D point-cloud comprising a set of point locations;
  (b) convert the 3D point-cloud to a 3D feature grid, wherein converting the 3D point-cloud to the 3D feature grid comprises:
    i) discretising the 3D space into cells according to a grid size;
    ii) making a determination as to whether the cells contain points from the 3D point-cloud;
    iii) for each cell into which at least one point from the 3D point-cloud falls, mapping the at least one point to a feature vector; and
    iv) for each cell into which no points from the 3D point-cloud fall, mapping the cell to a zero feature vector;
  (c) generate a detection window sized to contain an integral number of the cells of the 3D feature grid and having a set of positions which can be occupied within the 3D feature grid;
  (d) calculate, for each of the positions within the set of positions, a detection score, by:
    casting a vote for each cell within the 3D detection window into which at least one point from the 3D point-cloud falls, wherein each vote is calculated using the feature vector of the cell and a weighting vector; and
    summing the votes, and
  (e) determine whether each position within the set of positions contains an object of interest based on the detection score, wherein each detection window with a detection score greater than a threshold is classified as containing an object of interest.

In some embodiments, system may further comprise a sensor around which the 3D environment is located. Optionally, the sensor may generate the 3D point-cloud representation of the 3D environment.

In embodiments comprising a sensor, the sensor may be a LIDAR system. The skilled person would understand that many other types of sensor may be used instead of, or in addition to, a LIDAR system.

In additional or alternative embodiments, the system may further comprise one or more of the following:
  (i) a storage device which may be arranged to store at least one of the 3D point cloud, the 3D feature grid and results from calculations;
  (ii) a server which may be arranged to communicate with the processing circuitry.

In embodiments wherein the system comprises a server arranged to communicate with the processing circuitry, the server may be arranged to communicate with the processing circuitry via any suitable network, which may include the Internet and/or wireless telecommunications networks such as 3G, 4G, WIFI, or the like.

In some embodiments, the system may comprise a vehicle on which a sensor and at least some of the processing circuitry is mounted. The sensor may generate the 3D point-cloud representation of the 3D environment.

In embodiments wherein the system comprises a vehicle, the system may comprise a vehicle-based portion and a remote portion. Optionally, the system may be arranged to transfer data between the vehicle-based portion and the remote portion.

According to a third aspect of the invention, there is provided a vehicle having a sensor mounted thereon. The vehicle may have a processing circuitry arranged to detect objects within a three-dimensional (3D) environment around the sensor.

The processing circuitry may be arranged to perform at least one of the following steps:
  (a) obtain a 3D point-cloud representation of the 3D environment, the 3D point-cloud comprising a set of point locations;

(b) convert the 3D point-cloud to a 3D feature grid, wherein converting the 3D point-cloud to the 3D feature grid comprises:
  i) discretising the 3D space into cells according to a grid size;
  ii) making a determination as to whether the cells contain points from the 3D point-cloud;
  iii) for each cell into which at least one point from the 3D point-cloud falls, mapping the at least one point to a feature vector; and
  iv) for each cell into which no points from the 3D point-cloud fall, mapping the cell to a zero feature vector;
(c) generate a detection window sized to contain an integral number of the cells of the 3D feature grid and having a set of positions which can be occupied within the 3D feature grid;
(d) calculate, for each of the positions within the set of positions, a detection score, by:
  casting a vote for each cell within the 3D detection window into which at least one point from the 3D point-cloud falls, wherein each vote is calculated using the feature vector of the cell and a weighting vector; and
  summing the votes; and
(e) determine whether each position within the set of positions contains an object of interest based on the detection score, wherein each detection window with a detection score greater than a threshold is classified as containing an object of interest.

Optionally, the sensor may be a LIDAR system.

In at least some embodiments, the processing circuitry detects objects of interest in the 3D environment around the sensor as the vehicle moves. In at least some embodiments, object detection is performed in real-time as the vehicle moves.

According to a fourth aspect of the invention, there is provided a machine readable medium containing instructions which when read by a machine cause that machine to perform as at least one of the following:
  (i) the method of the first aspect of the invention;
  (ii) at least a portion of the system of the second aspect of the invention; and
  (iii) the vehicle of the third aspect of the invention.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

The prior art methods are therefore not truly 3D in the approach taken. In contrast to the prior art, the approach proposed herein does not require a 2D representation of the environment. At least some embodiments, use 3D data, which may be laser data, and no projection is involved, to generate a 2D representation, providing a three-dimensional approach to object detection.

There now follows by way of example only a detailed description of embodiments of the invention with reference to the accompanying drawings in which:

FIG. 1 is a schematic view of a vehicle equipped with a sensor and processor for implementing an embodiment;

FIG. 2 provides an illustration of the detection process of an embodiment;

FIG. 3a provides an illustration of the duality between convolution and voting, as used in an embodiment;

FIG. 3b provides an illustration of votes that a single occupied cell casts, according to an embodiment;

FIGS. 4a, 4b and 4c illustrate the motivation for shape factors in window detection in 3D for (a) vertical shafts, (b) locally planar patches, and (c) locally randomly distributed points giving rise to a high spherical score;

FIG. 7b shows the Precision-Recall curves corresponding to FIG. 7a for training on only the "moderate" positive training examples;

FIG. 7c shows the Precision-Recall curves corresponding to FIGS. 7a and 7b for training on only the "easy" positive training examples;

Figure 7A:
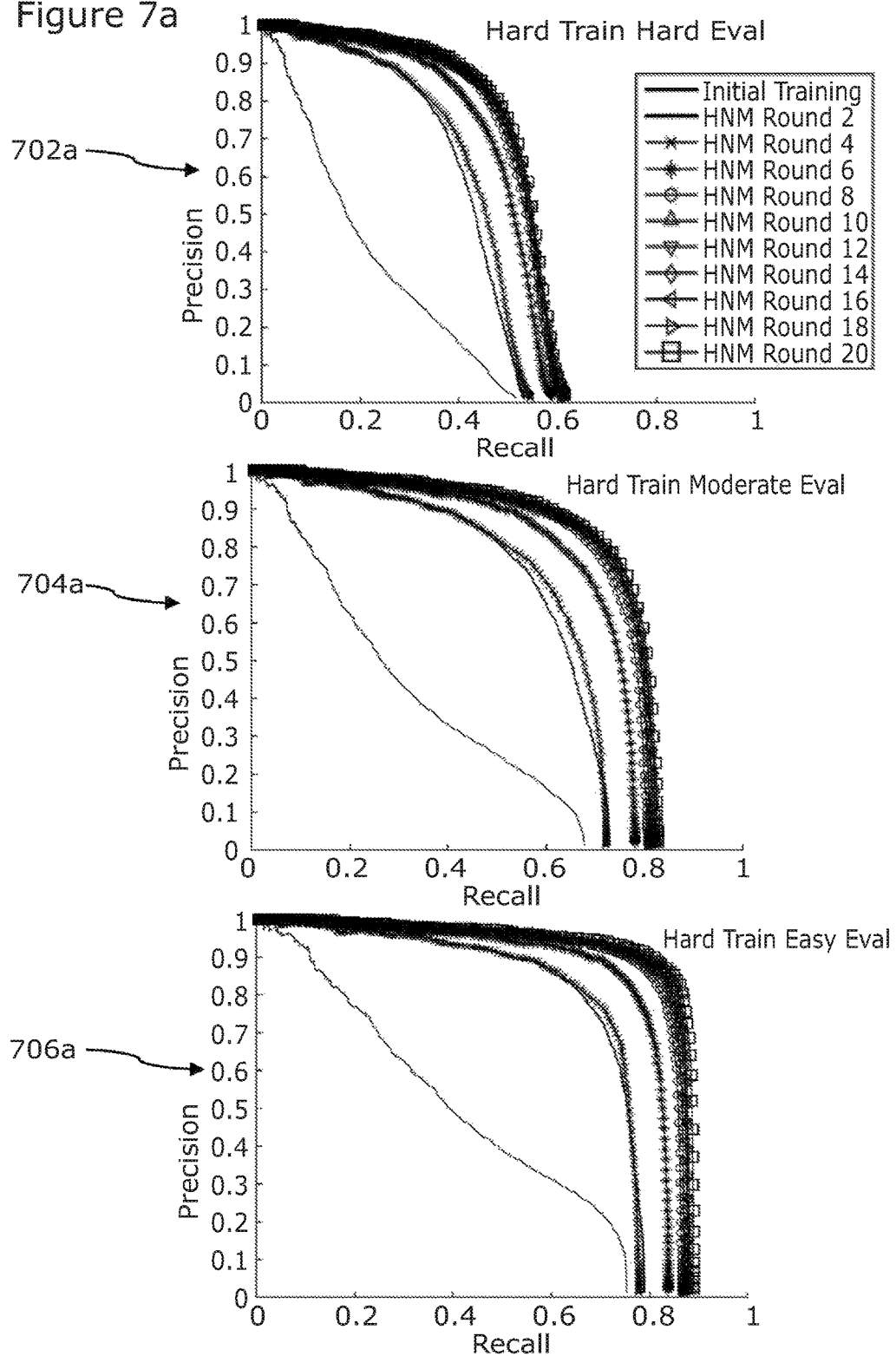
FIG. 7a shows the Precision-Recall curves for training of a system of an embodiment on all of the "hard" positive training examples and evaluation of the hard, moderate and easy difficulties respectively (from left to right)
Figure 8:
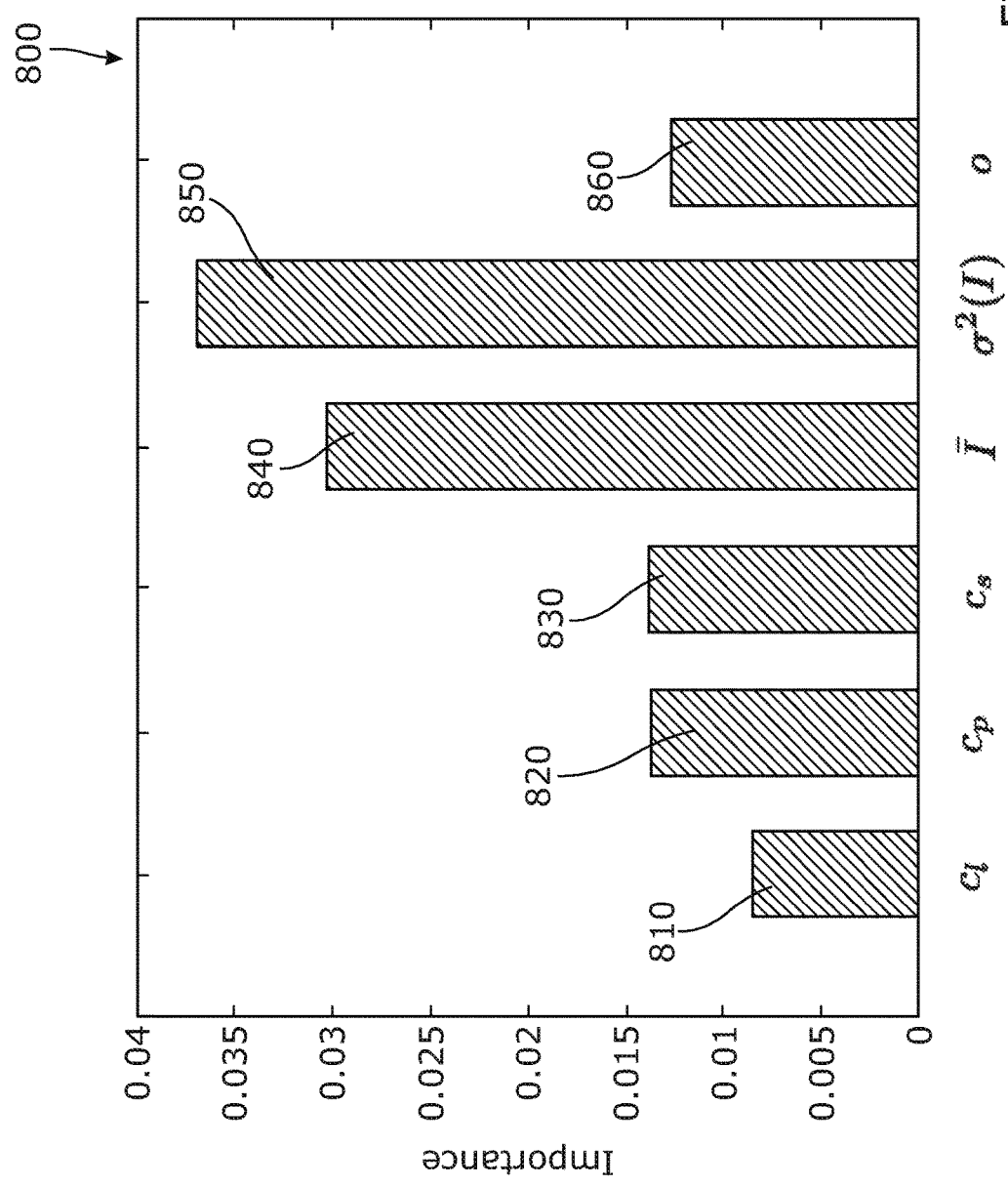
Figure 10C:
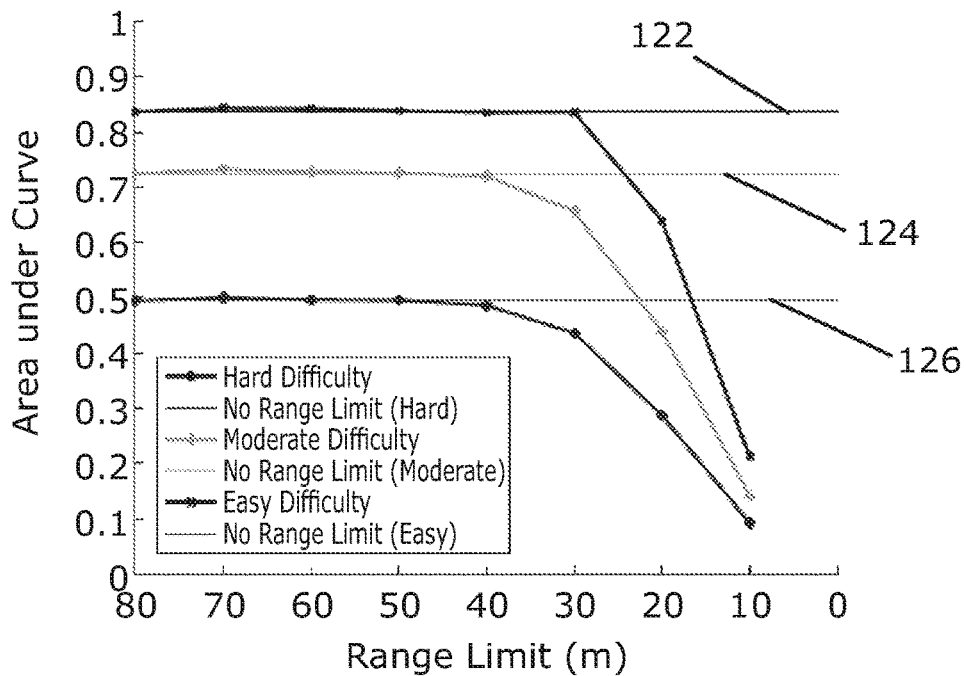
Figure 10D:
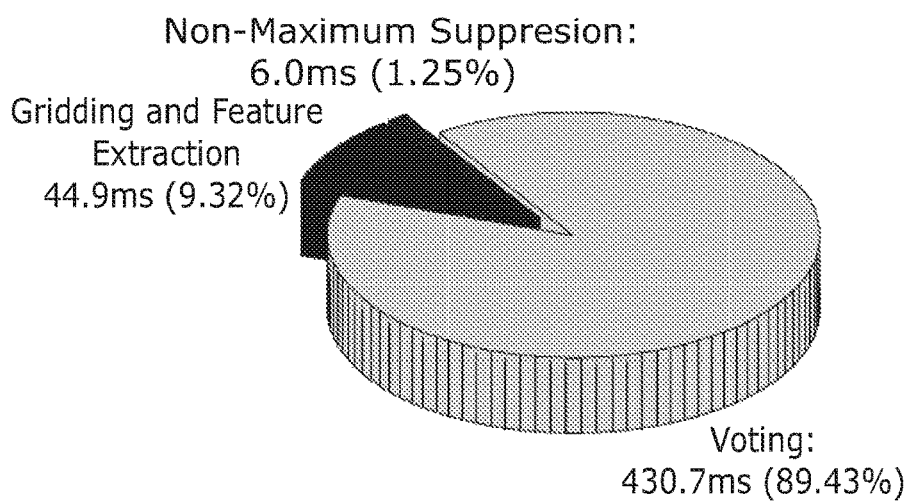
Figure 11:
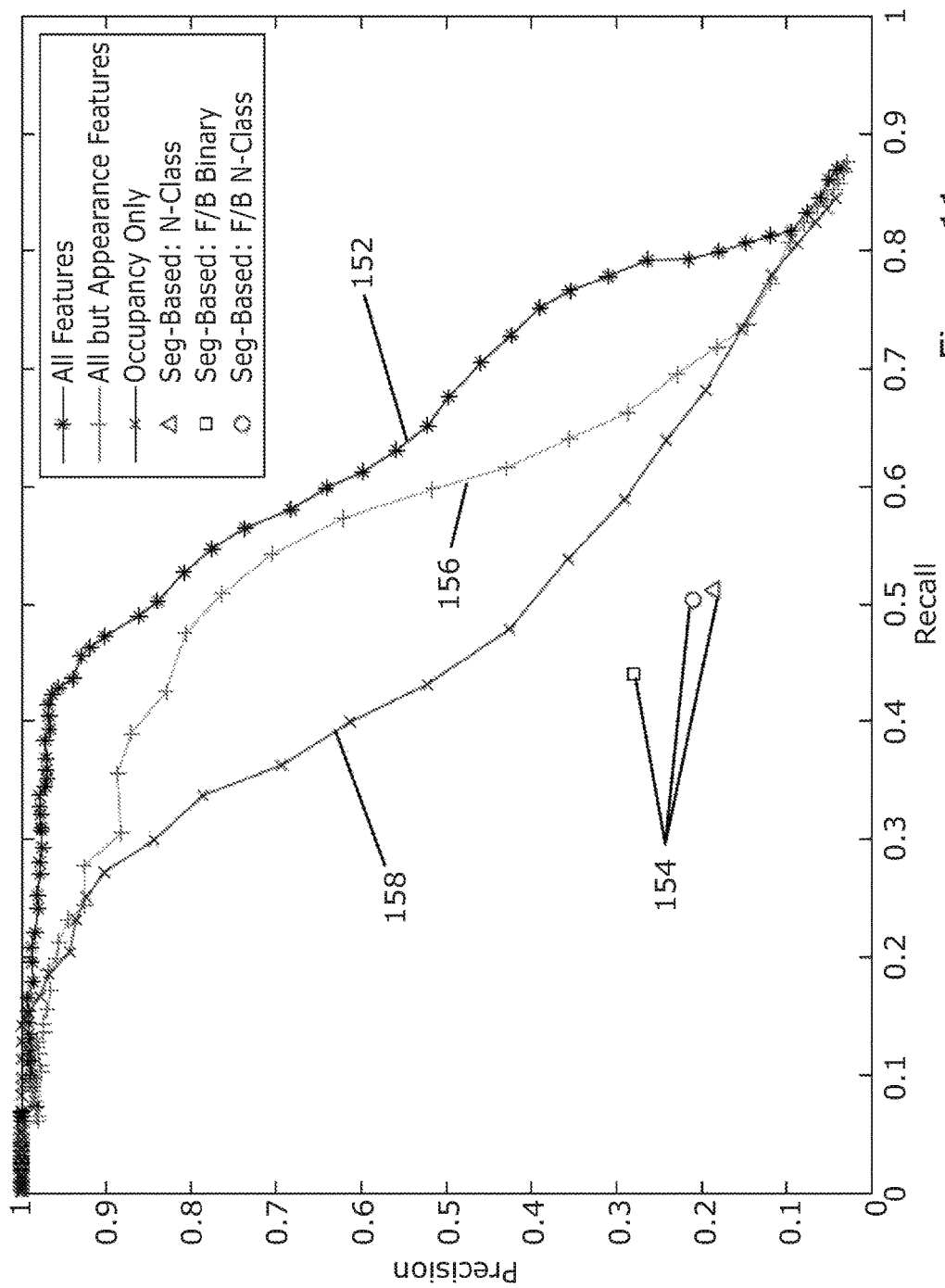
Figure 12:
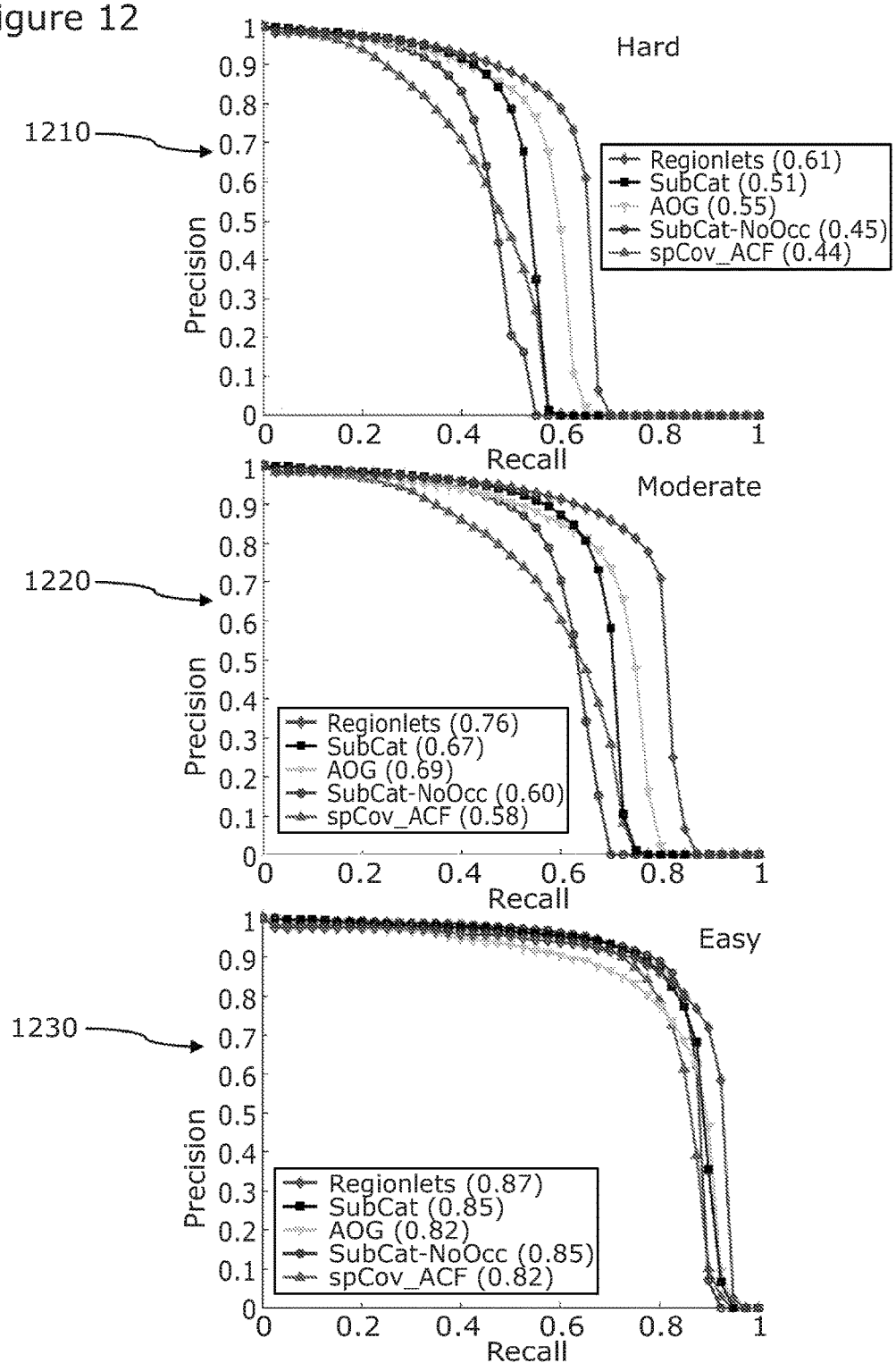

FIG. 7d compares the relative performances of the three different training strategies illustrated in FIGS. 7a to 7c at the end of training, again evaluated for the hard, moderate and easy difficulties respectively (from left to right);

FIG. 8 shows a plot of a measure of relative importance for an embodiment of features in the task of car detection;

FIG. 9 shows Precision-Recall curves of a detector of an embodiment trained with different feature selections on all "moderate" positive examples in the training set evaluated at the moderate and easy difficulty levels;

FIG. 10a shows computation time per frame for an embodiment versus frame number on a data sequence with and without a range limitation;

FIG. 10b is a histogram plot comparing the distributions of computation time per frame of the date sequence shown in FIG. 10a, with and without a range limitation;

FIG. 10c is a plot of performance of an embodiment on a test dataset as the range limit decreases, evaluated at all three difficulty levels (easy, moderate and hard);

FIG. 10d is a pie chart showing a decomposition of computation time per frame into the major system components, evaluated on one of the two data sequences shown in FIG. 10a;

FIG. 11 shows a comparative study of detection performance with the segmentation-based object detector proposed in the paper of Wang, Posner and Newman; and FIG. 12 (prior art) shows publicly reported Precision-Recall curves for the top five extant vision-based car detectors evaluated on the KITTI dataset, and may be compared to FIG. 7d.

Taking a naïve approach, 3D classification using a sliding window approach would typically involve the following steps:
  1. taking a volume of the 3D data, which is selected by a position of a detection window;
  2. stacking feature vectors for all cells in the detection window into a long feature vector;
  3. passing the long feature vector to a classifier;
  4. taking the sum of the scalar products of the feature vectors and weighting vectors for that detection window position;
  5. comparing the sum to a threshold; and 6. shifting the detection window to the next position.

Steps 1 to 6 would then be repeated for every possible detection window position. The skilled person would understand that the process listed in Steps 1 to 6 is computationally intensive and recognise that this computational intensity rules out such a method for real-time detection of objects.

Figure 1:
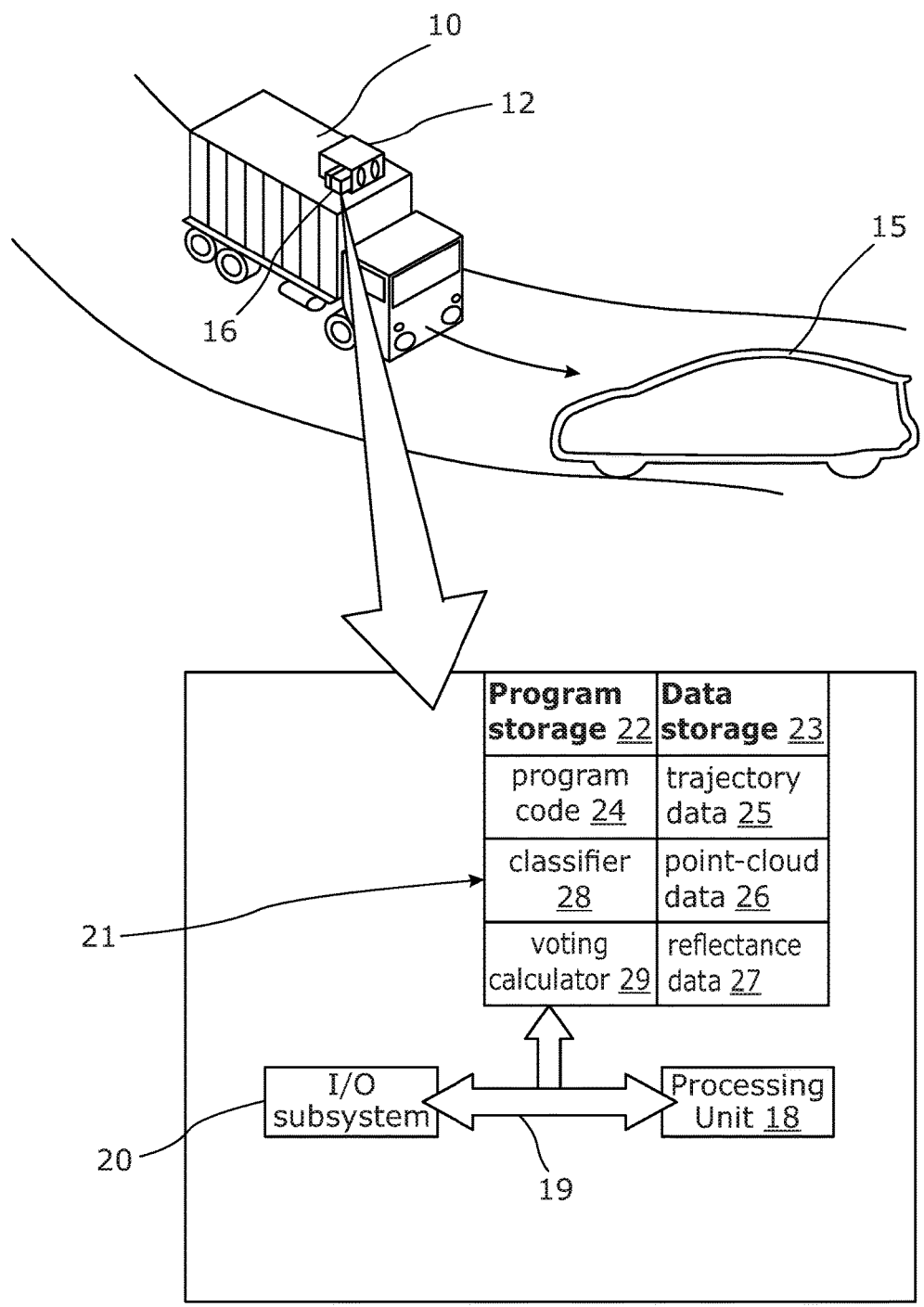

Embodiments of the invention are described in relation to a sensor 12 mounted upon a vehicle 10, as is shown schematically in FIG. 1. The skilled person would understand that the vehicle 10 could be replaced by a plane, boat, aerial vehicle or robot, or by a person carrying a sensor 12, amongst other options. In still other embodiments, the sensor used may be stationary.

The sensor 12 is arranged to monitor its environment 14, 15 and generate data based upon the monitoring, thereby providing data on a sensed scene around the sensor 12. In the embodiment being described, since the sensor 12 is mounted upon a vehicle 10, the sensor 12 is also arranged to monitor the environment 14, 15 of the vehicle 10.

Typically, the sensor 12 is an active sensor (ie it sends out radiation and detects the reflection thereof rather than passively collecting radiation from the environment) and in particular, in the embodiment being described, the sensor 12 is a LIDAR system. The skilled person would understand that the sensor 12 may be a passive sensor or an active sensor, or both. In the embodiment being described, the sensor 12 provides 3D point-cloud data of the environment 14, 15 through which it moves; ie it obtains a 3D point-cloud representation of the environment through which the sensor moves.

The skilled person will appreciate that other kinds of sensor 12 could be used, and that the sensor 12 may be stationary in some embodiments. In embodiments wherein the sensor 12 is stationary, the sensor 12 may not be located on a vehicle 10, and may instead be connected to a building or fixture (not shown).

In the embodiment shown in FIG. 1, the vehicle 10 is travelling along a road 14 and the sensor 12 is imaging the environment (eg the road 14, car 15, etc.) as the vehicle 10 moves.

In the embodiment being described, road should be read as being a segment that is navigable by a vehicle on which the sensor 12 is mounted. Therefore, the segment might be a road, a path, a track, a river, a canal, a corridor, or the like. In other embodiments, such as those wherein the sensor is carried by a person, plane, etc, road may have a wider context.

In the embodiment being described, the vehicle 10 also comprises processing circuitry 16 arranged to capture data from the sensor 12 and subsequently to process the data (in this case a 3D point cloud) generated by the sensor 12. Embodiments of the invention are described in relation to using 3D laser point-cloud data taken from a moving LIDAR system 12. The skilled person would understand that other sensor data types may be used.

Thus, the processing circuitry 16 captures data from the sensor 12, which data provides representations of the environment around the vehicle 10. In the embodiment being described, the processing circuitry 16 also comprises, or has access to, a storage device 22, 23 on the vehicle 10.

The lower portion of FIG. 1 shows components that may be found in a typical processing circuitry 16. A processor 18 may be provided which may be an Intel® X86 processor such as an i5, i7 processor, an AMD™ Phenom™, Opteron™, etc, an Apple A7, A8 processor, or the like. The processing unit 18 is arranged to communicate, via a system bus 19, with an I/O subsystem 20 (and thereby with external networks, displays, and the like) and a memory 21.

The skilled person will appreciate that memory 21 may be provided by a variety of components including a volatile memory, a hard drive, a non-volatile memory, etc. Indeed, the memory 21 may comprise a plurality of components under the control of the processing unit 18. However, typically the memory 21 provides a program storage portion 22 arranged to store program code 24 which when executed performs an action and a data storage portion 23 which can be used to store data either temporarily and/or permanently. Program code 24 may include software for vote calculation 29, as described below. The data storage portion 23 stores 3D point-cloud data 26 generated by the sensor 12. In other embodiments, at least a portion of the processing circuitry 16 may be provided remotely from the vehicle 10. As such, it is conceivable that processing of the data generated by the sensor 12 is performed off the vehicle 10 or partially on and partially off the vehicle 10. In embodiments in which the processing circuitry is provided both on and off the robot then a network connection (such as a 3G (eg UMTS—Universal Mobile Telecommunication System), 4G (LTE—Long Term Evolution) or WiFi (IEEE 802.11) or like) may be used. In particular, as described below, the classifier 28 may not be present on the vehicle 10.

It is convenient to refer to a vehicle 10 travelling along a road 14 but the skilled person will appreciate that embodiments need not be limited to any particular mobile apparatus or environment. Likewise, it is convenient in the following description to refer to 3D point-cloud data generated by a LIDAR system 12 but other embodiments may generate and use other types of data. The skilled person would understand that some embodiments do not include generation of the 3D point-cloud data, and may instead obtain 3D point-cloud data from a separate system. The 3D point-cloud data may therefore be generated in advance of implementation of such embodiments.

In the embodiment being described, the sensor 12, the processing circuitry 16 to which the sensor 12 is connected and the software running on the processing circuitry 16 form a detection and classification system to identify elements in the 3D point-cloud data collected by the sensor 12. The detection and classification system may be referred to as a detector 12, 16.

1. Overview

Figure 2:
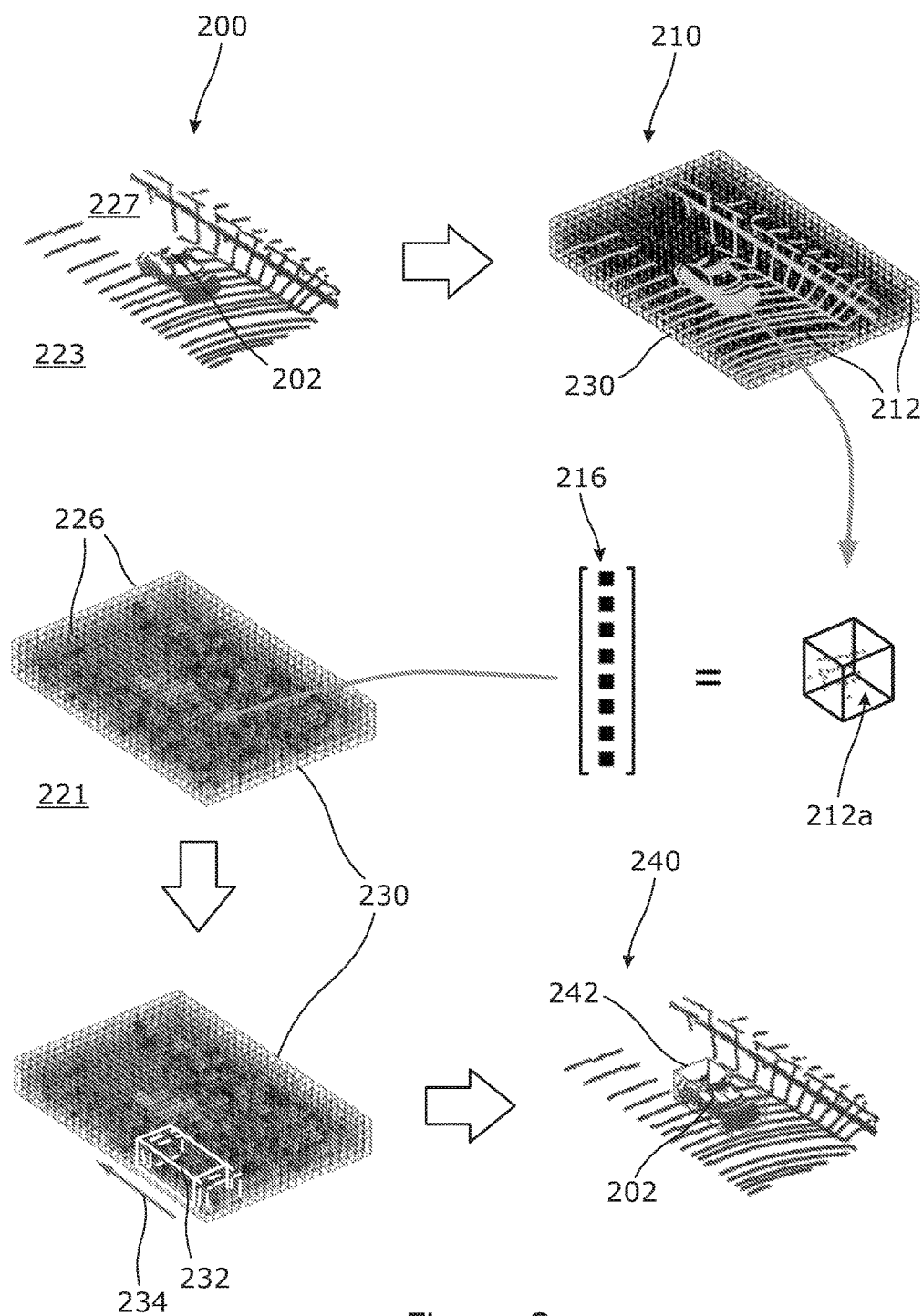

The steps required for the detector of the embodiment being described are conceptually analogous to an image-based sliding window detector. FIG. 2 illustrates the embodiment being described with a simple example—a small section 200 of a real 3D laser scan containing an object of interest 202, a car 202 in this case.

In the embodiment being described, the input for detection is the 3D laser scan data 200 (3D point-cloud data). The data comprise a list of point locations in 3D (ie a point for each location in the point cloud), together with reflectance values 27 for each point. The locations of the points provide the shape information while the reflectance values 27 provide some information about the appearance of the object. The skilled person would understand that, in other embodiments, reflectance values may not be provided. For example, shape information may be used alone, or colour or texture information or the like may be collected instead of, or as well as, reflectance values 27.

Firstly, the point-cloud 200 is converted into a feature grid 230 as follows. The 3D space is discretised according to a 3D grid 210 of fixed size. The 3D grid 210 comprises multiple cells 212, of which 212a is an enlarged example.

Each occupied cell (eg 212a) is converted into a fixed-dimensional feature vector 216. More specifically, for each occupied cell 212a, points that fall within the cell 212a, together with their reflectance values, are mapped to a fixed-dimensional feature vector 216. Occupation means that at least one point of the point-cloud 200 falls within the bounds of the cell.

Details of the feature representation used in the embodiment being described are explained in Section 4, below. Cells that are not occupied by any points (unoccupied cells, eg 212b) map to zero feature vectors (ie a vector of all zero elements). An advantage of embodiments that use zero feature vectors in this manner is that they facilitate exploitation of the sparsity of the problem which provides a significant increase in speed at which the data can be processed.

As an example of the potential speed increases, 3D detection of objects that are within 50 m of the sensor is considered. Assuming a moderate vertical range of 10 m, this gives a 100 m by 100 m by 10 m volume to process. Discretising this volume into 20 cm cells generates 12.5 million grid cells. A naïve approach, as outlined in Steps 1 to 6 above, would place the corner of a detection window at each of these 12.5 million cells and test whether it bounds an object of interest. Thus the processing of around 12.5 million windows would be needed (neglecting boundary conditions as they are irrelevant for the sake of this thought experiment). Even if it is assumed (unrealistically, with currently available processing power) that a single window can be processed within 1 µs, 12.5 seconds would be required to process a frame. By contrast, using the embodiments disclosed herein, the average computation time for such a case is under 0.5 s. Speed increases by a factor of 25, or indeed by two orders of magnitude or more, can therefore be envisaged when less generous assumptions are made with respect to the naïve approach.

Thus the point-cloud 200 is converted to a feature grid 230. Balls 226 represent feature vectors 216 extracted for the occupied cells 212a.

For example, as an illustration, the middle left diagram 221 of FIG. 2 visualises the feature grid 230 extracted over the section of 3D point-cloud 200 shown at the top left (ie sub image 223) of FIG. 2. Here, each ball 226 represents a feature vector extracted for an occupied cell 212a. Correspondingly, the absence of a ball means the cell is unoccupied and therefore its feature vector is zero. Note the sparsity of the feature grid 230—balls 226 only occupy a small subset of the entire grid 230 shown in sub image 221. In particular, the balls 226 lie only on a 2D surface of the world that the laser traces out when the 3D point-cloud data 200 is obtained. For example, as can be seen from sub image 223 there is a void 227 behind the car 202, since the car prevents the laser from scanning the volume of the void. In a similar manner the laser is largely unable to scan internal portions of features in the environment.

Then, conceptually, a 3D detection window 232 of a fixed size is placed at one corner of the feature grid 230 and slides 234 down the x-direction then the y-direction and then the z-direction. In other embodiments, the axes may be scanned in a different order. Additionally or alternatively, a different coordinate system may be used in place of a Cartesian coordinate system. For example, in some embodiments, a cylindrical coordinate system, or the like, may be used. In embodiments wherein a cylindrical coordinate system is used, the 3D detection window 232 may be slid down the z axis, rotated through 360° around the z axis and slid along the radial distance from the z axis.

In the embodiment being described, the 3D detection window 232 is sized to contain an integral number of the cells 212 of the 3D feature grid 230. In the embodiment being described, the detection window 232 is cuboid in shape (a rectangular box). The skilled person would understand that other shapes could be used, for example a cubic detection window.

Figure 3A:
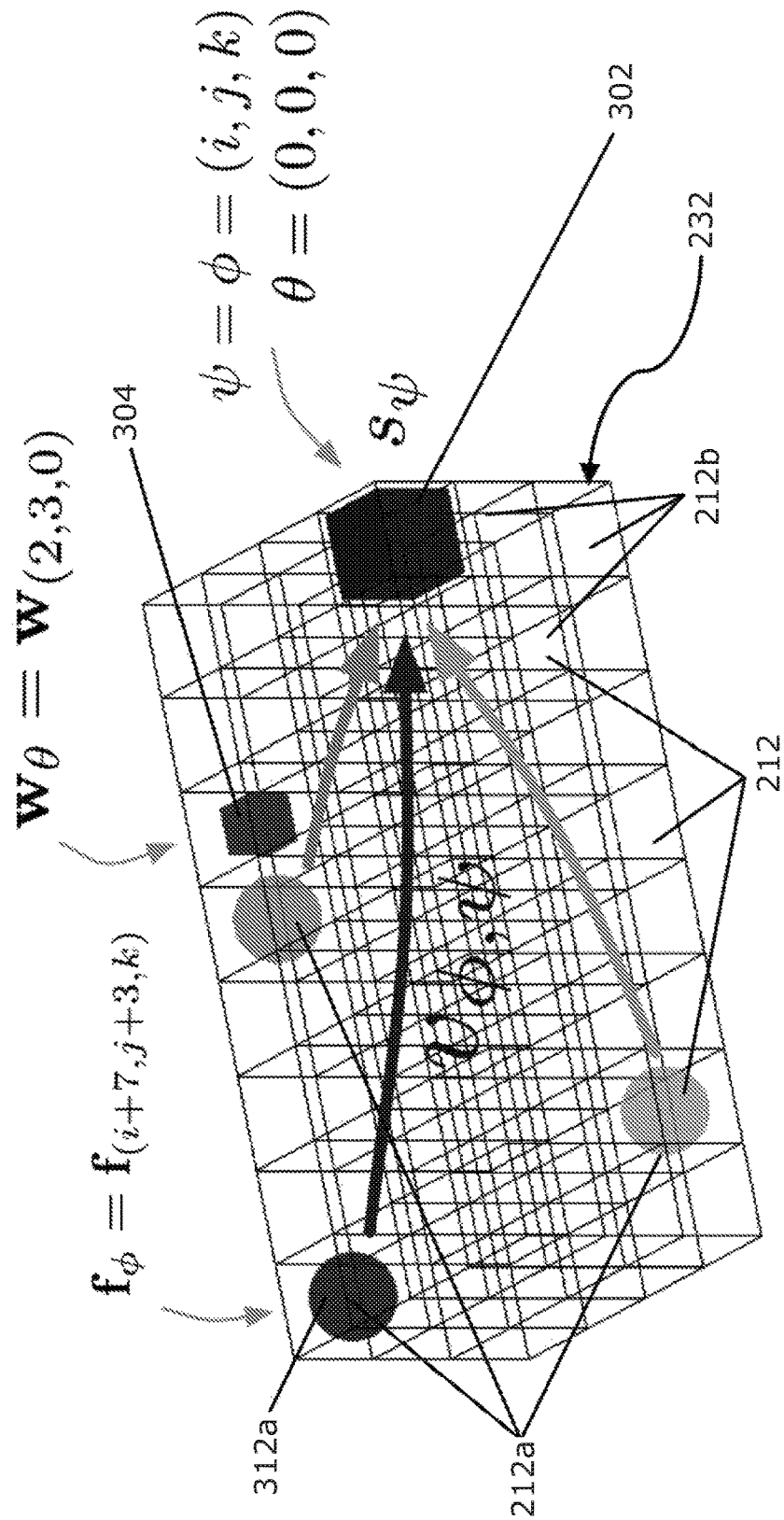

In FIG. 3a, the detection window 232 shown has dimensions of four cells by three cells by eight cells. The skilled person would understand that the number of cells 212 a 3D detection window's size covers may vary in other embodiments. For example, the 3D detection window may contain roughly any of the following number of cells 1, 2, 4, 12, 24, 50, 100 or 200 (or any number in between). The skilled person will understand that the number of cells 212 contained within the detection window 232 and the shape of the detection window 232 may be set according to one or more of the following factors, amongst other factors:
 (i) the expected point-cloud distribution;
 (ii) object of interest size;
 (iii) object of interest characteristics;
 (iv) processing capability of the system.

At each location of the detection window 232, the feature vectors 216 contained within its bounds are stacked up into a single long vector and passed to a classifier 28. In the embodiment being described, the classifier is a support vector machine (SVM) classifier. The classifier 28 then decides whether the current location of the detection window 232 bounds an object of interest 202 or not by means of returning a detection score (a higher score meaning higher confidence that it bounds an object of interest). Section 4.5, below, explains how to make this step computationally efficient and tractable.

The classifier 28 evaluates each window location for evidence of an object of interest 202. The point-cloud 240 with the detected object 202 is shown at the bottom right of FIG. 2. In the embodiment being described, the process is then repeated for each angle of rotation as discussed below.

Finally, just as is the case for image-based sliding window detectors, the classifier 28 may fire multiple times centred around the true object of interest 202. In the embodiment being described, non-maximum suppression is applied over returned object windows to suppress duplicate detections. The strategy for non-maximum suppression used in the embodiment being described is detailed in Section 5, below.

In contrast to image-based detectors, scale is not an issue in the embodiment being described, because the absolute scale (in meters) is known in 3D. The size of detection window 232 to use may be fixed based upon the known scale of objects of interest 202. Thus, it can be seen, in the embodiment being described, that the detection window 232 is sized to encompass objects of interest 202, eg the car 202.

The skilled person will understand that rotation of objects (such as the car 202) may present a problem since the object can appear at any, unknown, orientation within the point cloud 200. However, some embodiments, including the embodiment being described, may assume that objects of interest 202 are generally upright and so any rotation of the object 202 is constrained to be about the vertical axis, thereby reducing the amount of computation needed. In order to be able to detect objects of interest in arbitrary orientations around the vertical axis, the full 360° is discretised into N orientation bins, and the same detection process (cf. FIG. 2) is implemented N times on the rotated point-cloud, for each orientation bin. The skilled person will understand that the detection process can be run independently on the N orientation bins, such that the N orientation bins may be processed in parallel, sequentially (in any order), or the like.

Thus, an orientation bin relates to a sector of 360°/N degrees. Thus, the value of N that is chosen is a balance between the accuracy of the system (higher value for N) and the processing time required (lower value of N). Accordingly, embodiments balance these two constraints. In some embodiments, N is selected to be 8 or 16. In alternative embodiments, values for N between 4 and 64, and more preferably between 8 and 32, may be used. In the embodiment being described, N=8 is selected.

The skilled person will understand that classification can be divided into two phases, namely training of the classifier 28 on a training data set, and use of the classifier 28 to identify objects of interest.

In the embodiment being described, a sliding window approach like those described in the prior art is taken to training the classifier 28. The skilled person will understand that implementing the prior art sliding window approach, as described conceptually above, is time-consuming and computationally intensive. However, time minimisation is not needed for training—for example, training software can be left running for a period of time before use of the classifier 28 is needed. The result of the training phase is a weighting vector, w, indicating how likely feature vectors 216, f, are to indicate the presence of an object of interest 202.

In a naïve approach, as described above in Steps 1 to 6, the same sliding window approach would be used in the classification phase as in the training phase, leading to slow and computationally demanding classification if 3D data are used. This naïve approach, when used as a classifier, would lead to real-time 3D classification being intractable with currently available and/or affordable computing power. An advantage of at least some of the embodiments herein is to provide an on-line classifier (ie a classifier that can be used in real-time, or at least pseudo real-time) to detect objects.

In the embodiment being described, the weighting vector, w, obtained from the training phase is used directly in conjunction with the data to be classified and so embodiment do not pass data to the classifier 28 once training is complete. Computational efficiency is therefore increased.

In the training phase, a set of bounding boxes 242 are provided. The bounding boxes 242 may be thought of as being equivalent to detection windows 232. Each bounding box 242 comprises multiple cells 212. Each bounding box 242 either contains an object of interest 202, eg a car (a positive example), or does not contain an object of interest (a negative example). In the training set, it is known which bounding boxes 202 are positive examples, and which are negative examples.

For each bounding box 242, the feature vectors 216 for each cell 212 contained within its bounds are stacked up into a single long feature vector and passed to a classifier 28 (for example, an SVM classifier, described below).

A training algorithm is implemented by the classifier 28 to teach the classifier 28 to separate the positive and negative examples. Classification (ie separation of the positive and negative examples) is performed by calculating a score for the features in a bounding box 242 and applying a threshold. Each feature is given a weight. The sum of the scalar products of feature vectors and weighting vectors is calculated. If the sum is greater than a selected threshold, the bounding box 242 is classified as being a positive example. If the sum is not greater than the selected threshold, the bounding box 242 is classified as being a negative example. The weightings given are adjusted until the classifier 28 can correctly separate positive and negative examples—the classifier 28 learns the weights suitable for particular features. The output from the trained classifier 28 is the weighting vector, w.

Once the classifier 28 has been trained, classification of real-world/new 3D data can then be performed. That is, data generated by the sensor 12 can be processed and objects detected within that data originating from the sensor 12.

As described above, the classification phase of the naïve approach would involve the listed Steps 1 to 6. Steps 1 to 6 would then be repeated for every possible detection window 232 position, as was done for each bounding box 242 in the training phase. As described below, the embodiments disclosed herein illustrate that a less computationally intensive approach can be used for the classification phase.

In the embodiment being described, the classifier 28 is not needed in the classification phase. An approach which is mathematically equivalent to the sliding window approach but which uses a different world view is implemented.

Instead of sliding a volume (the detection window 232) along in three dimensions and calculating a score for each position in turn, scores for all possible/hypothetical detection windows are computed by voting. All cells 212 cast votes for each hypothetical detection window 232 position, based on their occupancy and the previously-calculated weighting vector w. The detection window 232 positions are described as hypothetical because the need for mathematically moving a detection window 232 to every possible location is obviated.

Implicit classification is therefore obtained by use of the weighting vector. The calculated scores are identical to those that would be obtained if the classifier 28 and standard sliding window approach were used, as is described below.

The skilled person would understand that the embodiments disclosed herein render application of a sliding window technique to 3D data more computationally efficient without reducing accuracy. Conceptually, the process is the same. In terms of implementation, computational efficiency is improved, in some embodiments by a factor of at least around 25 to 100, as described above.

Classification from 3D data can be performed in real-time using the embodiments described herein. Here real-time is intended to mean that the embodiment can output detected objects as the point cloud 200 is generated and processed. Real-time output may therefore be used to inform navigation decisions of the vehicle as the vehicle moves through the environment. In the embodiment described below, frame processing at a rate of 2 Hz is discussed. The skilled person would understand that the achievable frequency depends on available processing power and number of points per frame, amongst other variables. Frequencies of 1 Hz, 2 Hz, 5 Hz, 10 Hz could be envisaged, for example on typical processing power available at home, and the achievable frequencies will increase with improved processing power.

2. Linear SVM Versus Non-Linear SVM (Support Vector Machine)

For the classifier 28, a linear SVM is chosen in the embodiment being described (readers unfamiliar with the SVM classifier are referred to "*Pattern Recognition and Machine Learning*", Chapter 7, C. M. Bishop, 2006, Springer, Information Science and Statistics Series for a review of SVM classification). The skilled person will appreciate that, various alternatives to SVM are available for use as the linear classifier 28, for example logistic regression or the perceptron algorithm, or the like.

In the embodiment being described, the feature vector 216 for input to the SVM classifier 28 is the stacked feature vector composed of features extracted for each cell 212 in the detection window 232/bounding box 242 (which is itself a 3D grid, albeit smaller than the feature grid 230).

In the embodiment being described, in the training phase, bounding box 242 stacked feature vectors are provided to the classifier 28. In the classification phase, the embodiment being described obviates the need for detection window 232 stacked feature vectors to be provided to the classifier 28, as described above.

However, as shown in Section 3, convolution on a sparse feature grid 230 can be viewed from a different angle. This leads to an efficient way of computing the detection scores, fully exploiting the sparse nature of the problem to reduce computational requirements.

The skilled person will understand that the technique described below is applicable for embodiments that utilise a linear classifier 28.

3. the Duality Between Sparse Convolution and Voting

Below, a proof that sparse convolution is equivalent to the process of voting is presented.

The feature grid 230 is naturally four-dimensional—there is one feature vector 216 per cell 212, and cells 212 span a three-dimensional grid 210. The l'th feature at cell location (i, j, k) is denoted by $f^l_{ijk}$. Alternatively, it may be convenient to refer to all features computed at location (i, j, k) collectively as a vector $f_{ijk}$. To keep the presentation simple and clear, the tuple (i, j, k) is referred to by a single variable, $\phi=(i, j, k)$.

If the grid dimension is $(N^G_x, N^G_y, N^G_z)$ then the set $\Phi=[0,N^G_x) \times [0,N^G_y) \times [0,N^G_z)$ is defined, thus $\phi \in \Phi$. Hence the notation [m,n) is to be understood as the standard half-open interval defined over the set of integers, i.e. $[m; n) = \{q \in \mathbb{Z} : m \leq q < n\}$ and "×" denotes the set Cartesian product.

In this notation, $f_{ijk}$ can be written in the cleaner form $f_\phi$ (this indexing notation is illustrated in FIG. 3a). Recall that by definition $f_\phi=0$ if the cell 212 at $\phi$ is not occupied. The concept can be captured by defining a subset $\Phi^* \subset \Phi$ that represents the subset of cell locations that are occupied. Thus $\phi \in \Phi \backslash \Phi^* \Rightarrow f_\phi = 0$. The feature grid 230 is sparse.

Similarly, if the dimensions of the detection window 232 is $(N^W_x, N^W_y, N^W_z)$, the set $\Theta=[0,N^W_x) \times [0,N^W_y) \times [0,N^W_z)$ can be defined. The weights associated with location $\theta \in \Theta$ are denoted as $w_\theta$ (an example is also illustrated in FIG. 3a). In contrast to the feature grid 230, the weights can be dense.

Finally, and to remove boundary conditions, the feature vectors 216 and weight vectors are defined to be zero if their indices are outside the bounds. For example, $w_\theta=0$ if $\theta=(-1, 0, 0)$. This extends the set of indices in both cases (feature and weights) to the full $\mathbb{Z}^3$. The formalities are now arranged such that the proof may be derived as shown below.

Theorem 1:

"The detection score $s_\psi$ for the detection window with origin placed at grid location $\psi$ can be written as a sum of votes from occupied cells that fall within the detection window."

Proof:

The explicit form for the detection score $s_\psi$ according to the linear classifier 28 is:

$$s_\psi = \Sigma_{\theta \in \Theta} f_{\psi+\theta} \cdot w_\theta \quad \text{Eq. (1)}$$

where "·" denotes the vector dot product. Since $w_\theta=0$ whenever $\theta \notin \Theta$, the summation can be extended to the entire $\mathbb{Z}^3$. Then, after a change of variables, $\phi=\psi+\theta$:

$$s_\psi = \sum_{\theta \in \mathbb{Z}^3} f_{\psi+\theta} \cdot w_\theta \quad \text{Eq. (2)}$$

$$= \sum_{\phi \in \mathbb{Z}^3} f_\phi \cdot w_{\phi-\psi} \quad \text{Eq. (3)}$$

$$= \sum_{\phi \in \Phi} f_\phi \cdot w_{\phi-\psi} \quad \text{Eq. (4)}$$

$$= \sum_{\phi \in \Phi^*} f_\phi \cdot w_{\phi-\psi} \quad \text{Eq. (5)}$$

Equation 4 follows from Equation 3 because $f_\phi=0 \forall \phi \notin \Phi$, and Equation 5 then follows from Equation 4 because $f_\phi=0$ for unoccupied cells (eg 212b) by definition.

Now, noting that $w_\theta=0 \forall \theta \notin \Theta$, this implies that the summation in Equation 5 reduces to:

$$s_\psi = \Sigma_{\phi \in \Phi^* \cap \Gamma_\psi} f_\phi \cdot w_{\phi-\psi} \quad \text{Eq. 6}$$

where $\Gamma_\psi = \{\phi \in \mathbb{Z}^3 : \phi-\psi \in \Theta\} = \{\phi \in \mathbb{Z}^3 : \exists \theta \in \Theta, \phi=\psi+\theta\}$.

If the vote from the occupied cell 212a at location $\phi$ to the window 232 at location $\psi$ is defined as $v_{\phi,\psi}=f_\phi \cdot w_{\phi-\psi}$, Equation 6 becomes:

$$s_\psi = \Sigma_{\phi \in \Phi^* \cap \Gamma_\psi} v_{\phi,\psi} \quad \text{Eq. (7)}$$

This completes the proof.

Theorem 1 gives a second view of detection on a sparse grid, in that each detection window 232 location is voted for by its contributing occupied cells 212a. Cell voting is illustrated in FIG. 3a. Indeed, votes being cast from each occupied cell 212a for different detection window 232 locations in support of the existence of an object of interest at those particular window locations can be pictured. This view of the voting process is summarised by the next corollary.

Corollary 1: The three-dimensional score array s can be written as a sum of arrays of votes, one from each occupied cell 212a.

Proof:

First, it is noted that s is a function that maps elements in $\mathbb{Z}^3$ to real numbers (the detection scores at different window locations), that is s: $\mathbb{Z}^3 \rightarrow \mathbb{R}$. With this view in mind, combining Equation 5, with the previous definition of the vote $v_{\phi,\psi}=f_\phi \cdot w_{\phi-\psi}$, Equation 8 is obtained:

$$s_\psi = \Sigma_{\phi \in \Phi^*} v_{\phi,\psi} \quad \text{Eq. (8)}$$

Now, v is defined for each $\phi, \psi \in \mathbb{Z}^3$. Given a fixed $\phi$, with some abuse of notations, a function $v_\phi: \mathbb{Z}^3 \rightarrow \mathbb{R}$ is defined such that $v_\phi(\psi)=v_{\phi,\psi} \forall \psi \in \mathbb{Z}^3$. It is now obvious that the three-dimensional score array s can be written as:

$$s = \Sigma_{\phi \in \Phi^*} v_\phi \quad \text{Eq. (9)}$$

The structure of the 3D array $v_\phi$ is then considered. By definition, $v_\phi(\psi)=v_{\phi,\psi}=f_\phi \cdot w_{\phi-\psi}$, this implies that $v_\phi(\psi)=0$ whenever $\phi-\psi \notin \Theta$. Noting that $\phi$ specifies the "ID" of the occupied cell 212a from which the votes originate, and the window location a vote is being cast to, this means that only windows 232 at locations satisfying $\phi-\psi \in \Theta$ can receive a non-zero vote from the cell 212a.

Now, given a fixed $\phi$, the set $\Lambda_\phi = \{\psi \in \mathbb{Z}^3 : \phi-\psi \in \Theta\} = \{\psi \in \mathbb{Z}^2 : \exists \theta \in \Theta, \psi=\phi-\theta\}$ is defined. Then the argument above limits the votes from cell $\phi$ to the subset of window locations given by $\Lambda_\phi$. Window locations are given in terms of the coordinates of the origin 302 of each window. $\Lambda_\phi$ includes the origins of all windows which could receive a non-zero vote from the cell location φ, ie all windows which include the cell location φ.

Figure 3B:
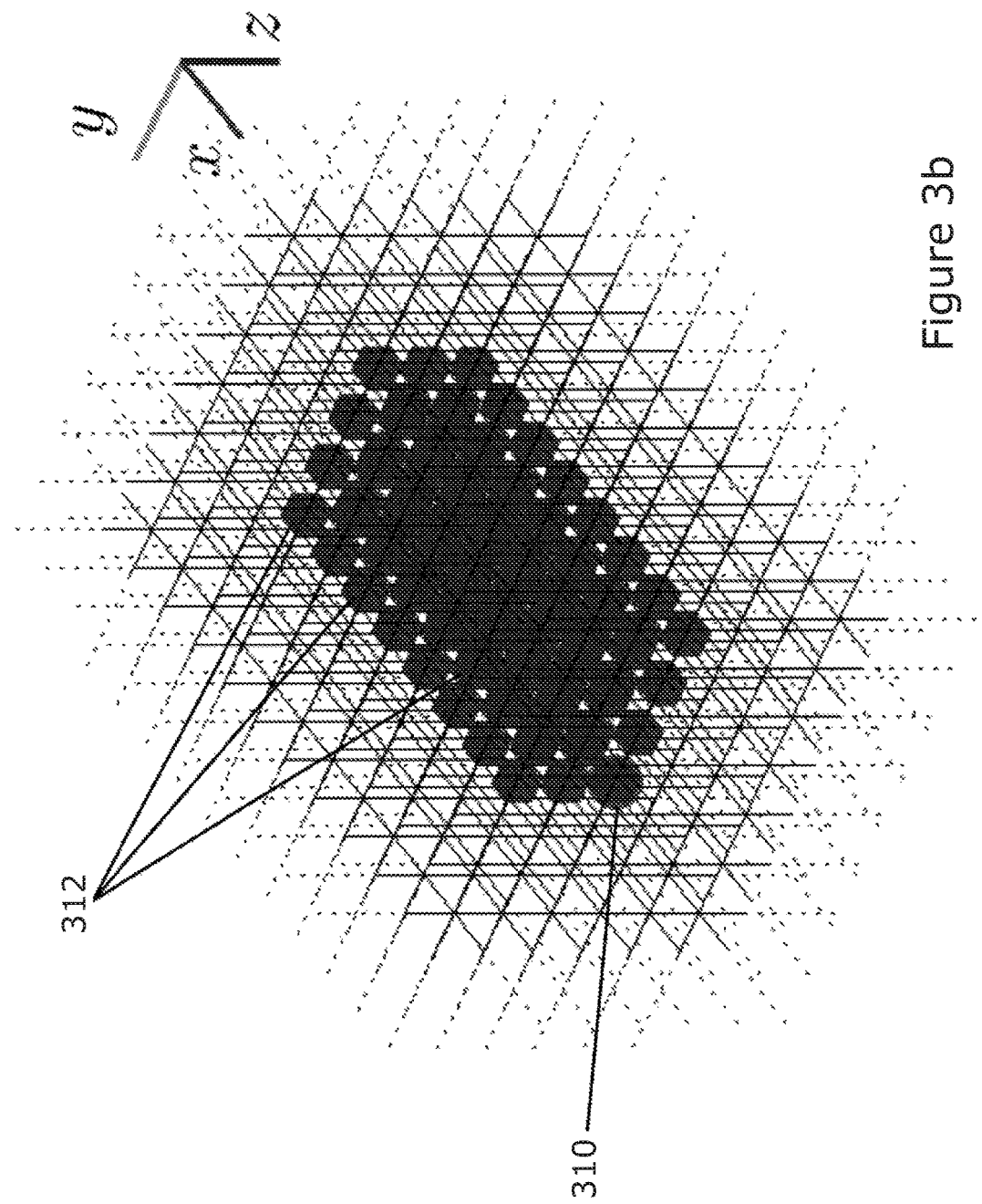

Referring to FIG. 3b, the grey sphere 310 in the figure represents the location of the occupied cell φ and cubes 312 indicate window origin locations that will receive votes from φ, that is, the set $\Lambda_\phi$.

FIGS. 3a and 3b therefore provide an illustration of the duality between convolution and voting. The location of the detection window 232 shown in FIG. 3a happens to include only three occupied cells 212a (represented by the three grey spheres). The origin 302 (anchor point) of the detection window 232 is highlighted by the larger grey cube at the corner of the detection window 232. The origin 302 happens to coincide with the cell location φ=φ=(i, j, k) on the feature grid 230. Being the origin 302 of the detection window 232, the anchor point 302 has coordinates θ=(0, 0, 0) on the detection window 232.

The feature vector 216 for the occupied cell 312a at grid location φ=(i+7, j+3, k) is shown as an illustration. The weights from the linear classifier 28 are dense, and four-dimensional. The weight vector for an example location θ=(2, 3, 0) is highlighted by a small grey cube 304. All three occupied cells 212a cast votes to the window location φ, contributing to the score $s_\phi$.

FIG. 3b shows an illustration of the votes that a single occupied cell 312a casts. The location of the occupied cell 312a is indicated by the grey sphere 310 and the origins 302 of detection windows 232 that receive votes from the occupied cell 312a are represented by grey cubes 312. This example is for an 8×4×3 window.

With the insight of the structure of voting gained, Corollary 1 readily translates into an efficient method: see Table 1, below—to compute the array of detection scores s by voting.

TABLE 1

| | Method 1 |
|---|---|
| 1 | Function Compute Score Array (w, f) |
| | Input: Weights of the classifier w and the feature grid f. |
| | Output: The array of detection scores s. |
| 2 | // Initialise the score array with zero values. |
| 3 | for ψ ∈ Ψ do |
| 4 | $s_\psi \leftarrow 0$; |
| 5 | end |
| 6 | // Begin voting. |
| 7 | for φ ∈ Φ* do |
| 8 | for θ ∈ Θ do |
| 9 | $s_{\phi-\theta} \leftarrow s_{\phi-\theta} + f_\phi \cdot w_\theta$; |
| 10 | end |
| 11 | end |
| 12 | return s; |
| 13 | end |

The new set of indices $\Psi \subset \mathbb{Z}^3$ introduced in Method 1 is the set of window locations that possibly receive a non-zero score, that is, $\Psi = [1-N_x^W, N_x^G] \times [1-N_y^W, N_y^G] \times [1-N_z^W, N_z^G]$. The main calculation happens inside the double loop where the dot product $f_\phi \cdot w_\theta$ is computed for all φ∈Φ* and θ∈Θ. This, in fact, can be thought of as a single matrix-to-matrix multiplication as follows. First, all the feature vectors 216 for the occupied cells 212a are stacked horizontally to form a feature matrix F that is of size d×N, where d is the dimension of the feature vector per cell, and N is the total number of occupied cells.

Then, the weights of the classifier are arranged in a weight matrix W of size M×d, where M is the total number of cells 212 of the detection window 232. That is, each row of W corresponds to the transposition of some $w_\theta$ for some θ∈Θ. Now all the votes from all occupied cells 212a can be computed in one go as V=WF. The M×N votes matrix V then contains for each column the votes going to the window locations $\Lambda_\phi$ for some occupied cell φ∈Φ*.

However, despite the elegance of embodiments providing the method by computing all of the votes, the skilled person will understand that, in practice, other embodiments may compute individual columns of V as $v_i = Wf_i$. Using the notation, where $v_i$ denotes the i'th column of V and similarly $f_i$ the i'th column of F. These votes can then be added to the score matrix at each iteration in a batch. The reason that embodiments that calculate the individual columns of V may be advantageous is that the size of the entire matrix V is M×N, that is, the total number of cells 212 in the detection window 232 (which can be in the order of a thousand) by the number of all occupied cells 212a in the entire feature grid 230 (a fraction of the total number of cells in the feature grid). In most practical cases with presently available and affordable computational resources, V is simply too large to be stored in memory. The skilled person will understand that, as computational technology advances, memory storage may cease to be an issue and V may advantageously be calculated directly.

Corollary 2 verifies that sliding window detection with a linear classifier 28 is equivalent to convolution.

Corollary 2—for some w̃ related to w:

$$s_\psi = \Sigma_{\phi \in \mathbb{Z}^3} \tilde{w}_{\psi-\phi} \cdot f_\phi \qquad \text{Eq. (10)}$$

Proof: Looking at Equation 3, a reversed array of weights w̃ may be defined by setting $\tilde{w}_\theta = w_{-\theta}$ for all $\theta \in \mathbb{Z}^3$. Equation 10 then follows from Equation 3.

There are three main differences between the embodiments presented herein and the PRISM framework of Lehmann et al. cited previously (other than that they are applied to different sensor modalities—Lehmann et al. focus on image-based object detection):

1. the "votes" are not cast into a continuous search space, the possible/hypothetical discrete locations of the sliding window 232 are voted for directly;
2. there are no codebooks generated, feature vectors 216 are not matched to any exemplars. Instead, votes are simply the scalar product between the feature vector 216 and the corresponding weight vector; and
3. instead of a conceptual equivalence, the embodiment being described uses an exact mathematical equivalence for convolution on a sparse feature grid, as proved above.

The techniques described in this section can be transferred to the simpler 2D case with only small changes (in fact, one only needs to define the index sets Ψ, Θ and Φ to be subsets of $\mathbb{Z}^2$ instead of $\mathbb{Z}^3$). Thus these techniques may also prove useful for applications such as a sliding window detector for 2D laser scans, or sliding window object detection with sparse image features such as, for example, edge maps.

4. Feature Extraction

This section is concerned with the middle right block 216, 212a of FIG. 2. That is, given an occupied cell 212a containing scattered 3D points with reflectance values, how it is mapped to a fixed, finite-dimensional feature vector 216?

In the embodiment being described, the grid size is fixed to be 20 cm; ie each cell has dimensions of 20 cm×20 cm×20 cm. The skilled person would understand that other grid dimensions could be used in other embodiments, and that cells may not necessarily be cubic.

Since 20 cm is a small scale relative to the objects of interest selected (cars, etc), points contained within occupied cells 212*a* appear to have simple and local distributions. Broadly speaking, they may appear to be rod-like, plane-like, a scatter of points in space, or a mixture of the three. Shape factors are used to cover these examples.

FIGS. 4*a*, 4*b* and 4*c* illustrate three situations with examples from real 3D laser scans where the shape factors will be the most discriminative.

FIG. 4*a* shows a small point-cloud section 410*a* comprising a vertical shaft (here, a sign post; columns, poles and lamp posts are other examples). Vertical shafts provide cells 412*a* that have a locally rod-like point distribution.

FIG. 4*b* shows a small point-cloud section 410*b* comprising a planar region. Here, the planar region is part of a car—cars are mainly composed of locally planar patches. The cell 412*b* has a locally planar point distribution.

FIG. 4*c* shows a small point-cloud section 410*c* for data from a tree. Trees tend to provide a scatter of points that appear randomly distributed in the entire space, giving rise to a high spherical score.

All three cases 410*a*, 410*b*, 410*c* are taken from real 3D laser scans. Typical example cells 412*a*, 412*b*, 412*c* are indicated in each case and shown magnified at the top right of each Figure. The actual computed shape factors for the linear ($c_l$), planar ($c_p$) and spherical ($c_s$) scores are displayed at the bottom right of each Figure as bar charts. A generic cell 212 will have shape factors that are a blend of these three canonical cases.

Vertical shafts such as the shaft of the sign post shown in FIG. 4*a* will give a high linear score $c_l$. Planar patches on a car (FIG. 4*b*) will give cells 412*b* having a high planar score $c_p$. The crown of a tree typically appear as a scatter of points in space (FIG. 4*c*) in a laser scan and thus gives cells 412*c* with high spherical scores $c_s$. Of course in general shape factors computed for an occupied cell 212 may have any arbitrary proportions of linear, planar and spherical scores, making the shape factors far more descriptive than the simple canonical cases illustrated here.

To capture the appearance information provided by the reflectance values, the mean and variance of the reflectance values of points contained in the cell are also included in the feature set of the embodiment being described. These simple features may not appear to be descriptive when considering just a single cell 212. However, the cell size is typically small, thus the mean and variance are usually sufficient to capture the most useful aspects of the handful of points falling within a given cell 212. Considering that an object 202 is described by a collection of cells 212 (and that the relative positions of these cells 212 do matter), the overall descriptive power of these apparently simple features can be rich.

Finally, a binary occupancy feature is included that is 1 for a cell that is occupied 212*a* and 0 for a cell that is not occupied 212*b*. This gives a total of six features for each cell 212. The skilled person will understand that many additional or alternative features could be selected to implement the detector. However, the simple feature set chosen gives good detection performance as is demonstrated in Section 6.

5. Non-Maximum Suppression

Each object 202 may trigger multiple detections in its close vicinity. To remove duplicate detections, a non-maximum suppression procedure analogous to the technique commonly applied in Computer Vision is used (see, for example, N. Dalal and B. Triggs, "*Histograms of oriented gradients for human detection*", in Computer Vision and Pattern Recognition, 2005, IEEE Computer Society Conference, volume 1, pages 886-893 and A. Neubeck and L. Van Gool, "*Efficient Non-Maximum Suppression*", in Pattern Recognition, 2006, volume 3, pages 850-855).

Specifically, the "greedy" approach described in P. Felzenszwalb, R. Girshick, D. McAllester, and D. Ramanan, "*Object Detection with Discriminatively Trained Part-Based Models*", Pattern Analysis and Machine Intelligence, IEEE Transactions, 32(9), pages 1627-1645, 2010 is followed.

The non-maximum suppression proceeds as follows. All window locations (for all N discretised orientation bins—cf. Section 1) with a detection score higher than a threshold a are sorted in descending order of their detection scores.

The detection threshold σ is restricted to be non-negative, that is, σ≥0. This requirement is used to ensure that empty windows, which have a zero score, are always classified as negative.

The window locations are then taken in that order, and compared with the current list of accepted window locations. The list of accepted window locations is initialised to be empty. A window location is accepted and added to the list of accepted window locations if it does not overlap with any of the previously accepted object windows by more than a given threshold.

Overlap between two object windows is computed as the ratio of the volume of intersection over the volume of union.

5.1 Efficient Computation of Overlap Between Extruded Boxes

The computation of overlap between two axis aligned 2D boxes is commonly encountered for image-based sliding window detectors and efficient methods are known. The corresponding case in 3D, however, requires computing the overlap between oriented (i.e. non-axis-aligned) 3D boxes. Computing the intersection between two arbitrarily oriented 3D boxes efficiently is quite a complex problem (see S. A. Gottschalk, "*Collision Queries Using Oriented Bounding Boxes*", PhD thesis, The University of North Carolina at Chapel Hill, 2000).

Figure 5:
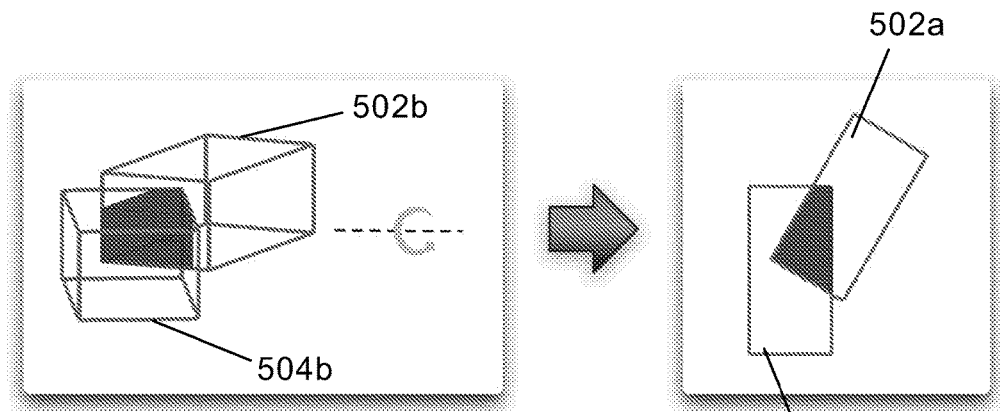
FIG. 5 is an illustration of two intersecting extruded boxes, 502 and 504.

Fortunately, in the embodiment being described, the orientation is not entirely arbitrary—rotation is constrained to be about the vertical axis. Each box (detection window 232/bounding box 242) may be treated as an arbitrarily oriented box in 2D a, 502*b*, and then extruded 502*b*, 504*b* along the vertical direction to make the full 3D detection window 232 (see FIG. 5 for an illustration). The intersection between two arbitrary polygons, of which oriented 2D boxes are special cases, is a well-studied problem in computational geometry, and efficient implementations are readily available (for example, the Boost Geometry library (www.boost.org) includes efficient implementations for both the test for intersection and the computation of the area of intersection for polygons).

6. Evaluation

To facilitate supervised learning (ie the training phase for the classifier 28), use is made of the publicly available KITTI dataset (see A. Geiger, P. Lenz, C. Stiller, and R. Urtasun, "*Vision meets robotics: The KITTI dataset*", The International Journal of Robotics Research, 32(11), pages 1231-1237, 2013). The object detection benchmark from the KITTI dataset supplies synchronised camera and Velodyne frames, with objects of interest 202 annotated in both image and laser data.

Of particular interest in the embodiment being concerned is that the annotations in the laser data are given as complete oriented 3D bounding boxes 242 bounding the object of interest 202 in a canonical orientation.

6.1 Training

The standard KITTI object detection benchmark contains a labelled training set and a labelled test set. The labels on the testing set are held back for evaluation purposes. For the purposes of the embodiment being described, a fair assessment of the performance of the sliding window detector on 3D data is desirable. As KITTI is primarily a vision-based dataset, training and testing datasets were created from the labelled data in KITTI that are publicly available (ie the original training dataset) by randomly splitting the original training dataset into two parts. The performance of the detector of the embodiment being described was then assessed based on metrics that are more suitable to evaluate detections in 3D (cf. Section 6.2).

Specifically, the 7,481 labelled frames available were randomly split into 80/20 proportions for training and testing respectively. The numbers of frames contained in the resulting training and testing sets, together with other information, are tabulated in Table 2.

TABLE 2

Data Splits for Training and testing

| | Number of Frames | Number of Cars | | |
|---|---|---|---|---|
| | | Hard (Total) | Moderate | Easy |
| All | 7481 | 28742 | 18971 | 12611 |
| Training (80%) | 5985 | 22802 | 15028 | 9941 |
| Testing (20%) | 1496 | 5940 | 3943 | 2670 |

For training the linear SVM classifier 28, the LIBLINEAR library was used (R.-E. Fan, K.-W. Chang, C.-J. Hsieh, X.-R. Wang, and C.-J. Lin, "*LIBLINEAR: A Library for Large Linear Classification*", J. Mach. Learn. Res., 9, pages 1871-1874, 2008). An initial set of negative examples (equal in number to the number of positive examples) are randomly sampled from the training data, taking care not to overlap with any positive examples.

Taking this initial set of training examples, the standard hard negative mining technique from image-based object detectors was adopted (see, for example, P. Felzenszwalb et al. and N. Dalal and B. Triggs, cited above, and K.-K. Sung and T. Poggio, "*Example-Based Learning for View-Based Human Face Detection*", IEEE Trans. Pattern Anal. Mach. Intell., 20(1):39-51, 1998).

Figure 6:
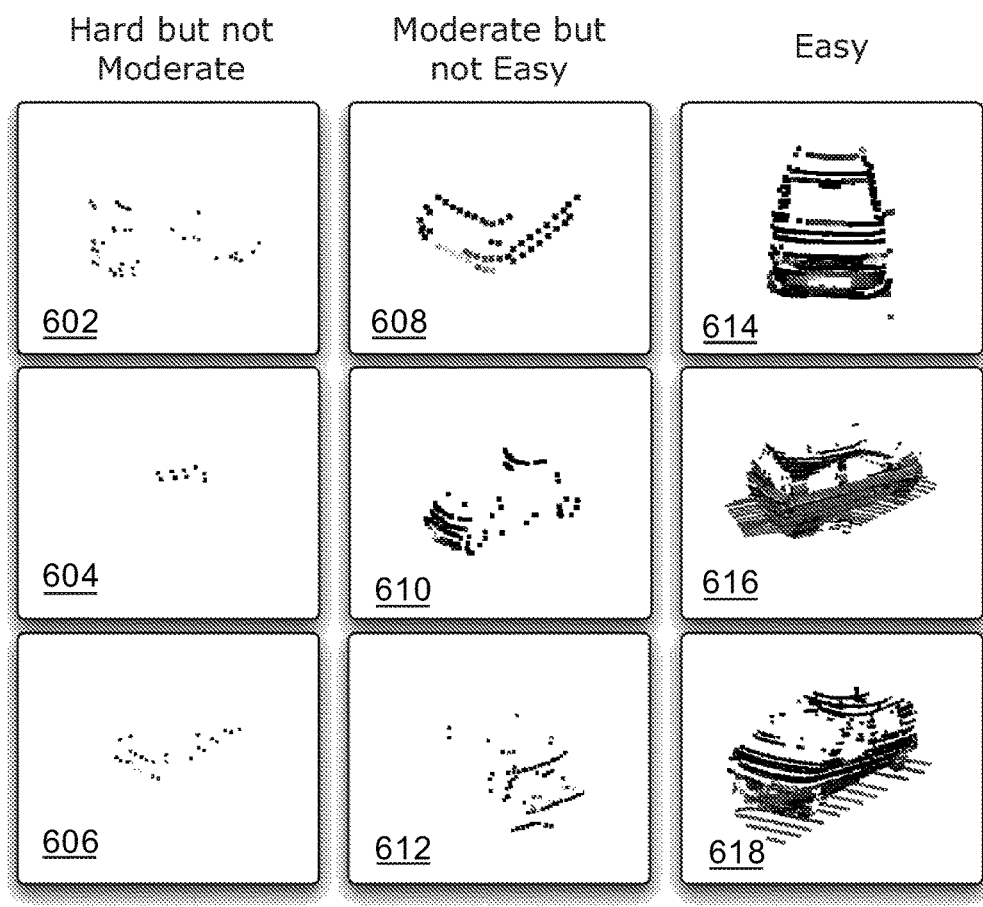
FIG. 6 shows examples of labelled "car" instances of different difficulties from a training set used in an embodiment.

Specifically, a classifier 28 is first trained on the initial training set. After training, the classifier 28 is applied back on all the training frames—examples of training frames are shown in FIG. 6. All false positive detections from this classifier 28 on all the training frames are collated, and sorted in descending order of the detection score. The first N (or all of the false positives if there are less than N of them) are then taken and added to the set of negative examples (hard negative mining). The classifier 28 is then retrained with this updated training set and this process may iterate for a predefined number of rounds. In all the experiments described herein, N is fixed to be 10,000 and 20 rounds of hard negative mining are conducted.

The skilled person will understand that a disadvantage of sliding window approaches is that artefacts may be introduced during the discretisation process. As window locations are only searched on the discretised feature grid 230 (and the discretised angle of rotation), it is unlikely that an object of interest 202 is captured in the detection window 232 in precisely its canonical pose. However, the positive examples for training are extracted from manual labels, the objects of interest 202 contained are therefore centred and facing forward. To compensate for this discrepancy, for each positive example, ten slightly translated and rotated (about the vertical axis) versions of it are randomly sampled, and appended to the set of positive examples for training.

6.2 Evaluation Strategy

FIG. 6 presents examples (602 to 618) of labelled car instances from the KITTI Velodyne data. As can be noted, from left to right, the identity of the object ranges from difficult to judge to being obvious that it is a car (as far as a human perceiver is concerned).

The object labels provided by the KITTI dataset on the 3D laser data are comprehensive in the sense that, as well as obvious object instances, challenging objects that are heavily occluded, or are very sparsely sampled due to being at a large distance from the sensor are included. The included objects of interest 202 may at times be as challenging as being described by only a handful of laser measurements (see, for example, the left column of FIG. 6—602, 604, 606).

The variety of challenge level motivates division of the labelled car instances into different difficulty levels similar to the original KITTI specification (see the paper of A. Geiger et al, cited above), to respect the complete set of labels from the dataset and at the same time not to place unreasonable demands to the detection system.

The original KITTI specification is tailored specifically to vision-based detection systems. In the embodiment being described, a closer look is taken into the dataset for the types of labelled car instances provided in the 3D laser data. Based on that, suitable criteria are devised for dividing the objects into "easy", "moderate" and "hard" difficulty levels. The "hard" difficulty level includes all examples labelled hard, moderate (eg 608, 610, 612) and easy. The "moderate" difficulty level includes all examples labelled moderate and easy, but not examples labelled hard (eg 602, 604, 606). The "easy" difficulty level includes only examples labelled easy (eg 614, 616, 618).

The left column of FIG. 6 (602, 604, 606) displays example ground truth labels that contain fewer than 50 laser measurements; the middle column (608, 610, 612) shows examples that contain between 50 and 150 laser measurements; the right column (614, 616, 618) gives examples that have over 150 measurements. Examples in the left column (602, 604, 606) contain insufficient measurements for even a human observer to identify the object of interest 202. On closer inspection, a human observer may be able to identify the examples of cars in the middle column (608, 610, 612). Finally, the features of a car are much better defined for the examples in the right column (614, 616, 618).

Given the observations above, "easy" car instances are defined as instances described by over substantially 150 laser measurements, "moderate" car instances are defined as instances described by over substantially 50 laser measurements, and "hard" car instances include all labelled instances provided in the dataset. Other embodiments may of course use other thresholds on numbers of laser measurements.

Note that the set of hard instances include the set of moderate instances, and similarly the set of moderate instances include the set of easy instances. Table 2 gives the number of labelled car instances for each difficulty level contained in the KITTI dataset and the splits used in the embodiment being described.

Precision and Recall metrics are used to evaluate the detector's performance on the test dataset and a brief summary is provided below. Precision and Recall are measures of performance for classification or detection systems defined as:

$$P = \frac{TP}{TP + FP} \qquad \text{Eq. (11)}$$

and $$R = \frac{TP}{TP + FN} \qquad \text{Eq. (12)}$$

where P and R denote Precision and Recall respectively, and TP, FP, FN represent the numbers of true positive, false positive and false negative classifications (or detections depending on what system is being evaluated) respectively.

The F-measures are balanced measures between Precision and Recall, and are defined by:

$$F_\beta = \frac{(1+\beta^2)PR}{(\beta^2 P) + R} \qquad \text{Eq. (13)}$$

Here again, P and R denote Precision and Recall respectively, and $\beta$ is a positive real number that specifies the weight given to Recall. For example, as $\beta \to 0$, $F_\beta \to P$, whereas as $\beta \to \infty$, $F \to R$. Arguably the most useful F-measure is the $F_1$-measure, where $\beta = 1$:

$$F_1 = 2 \frac{PR}{P+R} \qquad \text{Eq. (14)}$$

The $F_1$-measure gives equal weights to Precision and Recall, hence is commonly taken as an overall measure of system performance.

Specifically in the embodiment being described, Recall for each difficulty level (easy, moderate, hard) is computed as the ratio of the number of car instances belonging to that difficulty level that are successfully detected over the total number of car instances of that difficulty level. Precision is computed independently of difficulty levels as the usual ratio of true detections (of cars of any difficult level) over the total number of detections.

Detections are assigned to ground truth labels in a matter similar to that described in Section B of D. Z. Wang, I. Posner, and P. Newman, "*What Could Move? Finding Cars, Pedestrians and Bicyclists in* 3*D Laser Data*", in Proc. IEEE International Conference on Robotics and Automation (ICRA), Minnesota, USA, 2012. In this specific case, in addition to the overlap being required to be greater than 0.5 between the detection and the ground truth label, the detection has to match the angle of orientation of the ground truth object, that is, the angle of rotation about the vertical axis between the detected object box and the ground truth object box must be within $$\pm \frac{\Delta}{2}$$

where $\Delta$ is the angular resolution.

Each detection is assigned to at most one ground truth object of interest 202, and duplicate detections to the same ground truth object 202 are taken as false positives.

6.3 Detection Performance

Results obtained from implementation of the embodiment being described are presented in this section. The sliding window detector described above is trained with the training set according to the procedure outlined in Section 6.1, and evaluated on the test set. In the embodiment being described, there are only three parameters to the detector: the grid size (cell dimension, wherein the cells are cubic in the embodiment being described), the number of angular bins N and the overlap threshold $t_o$ for non-maximum suppression (cf. Section 5). In the experiments described herein, the following values are set: $\delta=0.2$ m, N=8 and $t_o=0.01$.

With the division of ground truth labels into difficulty levels as defined above, in addition to evaluating the performance of a certain classifier 28 at each difficulty level, the effect of training on only the ground truth objects 202 of a particular difficulty level may be investigated. For example, if the aim is good performance with respect to detecting "easy" cars, this may be reflected in the training stage by training on only "easy" car examples. Without the confusion introduced with ambiguous cases abundant in higher difficulty levels, the performance on easy cars might be expected to increase. As the classifier would not be presented with "hard" (ie hard but not moderate or easy, such as 602, 604, 606) cars at any point in the training, for example, the performance at the hard difficulty level is somewhat undefined.

Conveniently, embodiments may use one of three training schemas: training on only the easy; training on the moderate (including all "easy" cases and all "moderate" cases); and training on the hard (including all labelled cars) positive examples respectively.

FIGS. 7*a*-7*d* present results from an experiment where the detector is trained on the training set according to the three different training schemes, each evaluated on the three different difficulty levels on the test set. The Precision-Recall curves presented in FIGS. 7*a*-7*d* are generated by varying the detection threshold $\sigma$ (see Section 5). In general, the performance of the detector increases as the number of rounds of hard negative mining increases until convergence, as one would expect.

Regardless of the training scheme, the detector performs better as the evaluation difficulty decreases, with the best performance noted on the "easy" cars. According to FIG. 7*d*, the detector trained only on the easy car instances performs poorly compared with the other two training schemes on the hard and moderate difficulties, confirming the reasoning above.

However, training on only cases of a certain difficulty level does not seem to increase the detection performance for that difficulty level. For example, training on the easy positive examples (FIG. 7*c*) gives similar performance compared with the other two schemes (FIG. 7*a*, FIG. 7*b*) on the easy difficulty level, and training on the moderate cases (FIG. 7*b*) produces slightly worse performance at the moderate difficulty level than training on the hard cases—that is, all of the positive examples (FIG. 7*a*). This suggests that, for example, focusing training on only the "easy" cars does not necessarily increase performance on detecting easy car instances—the detector is capable of accommodating more difficult car instances in addition to handling the easy cases accurately. All three training schemes perform equally well evaluated according to the easy difficulty level.

FIGS. 7*a* to 7*c* show Precision-Recall curves as the number of rounds of hard negative mining (HNM) goes up. All Precision-Recall curves are generated on the test dataset.

FIG. 7a gives Precision-Recall curves for training on all the hard positive examples and evaluating for the hard 702a, moderate 704a and easy 706a difficulties respectively (from left to right). Similarly, FIG. 7b and FIG. 7c present the corresponding results for training on only the moderate (702b, 704b, 706b) and easy (702c, 704c, 706c) training examples respectively. Precision-Recall curves are shown for every two rounds of hard negative mining.

FIG. 7d compares the relative performances of the three different training strategies at the end of training (HNM Round 20) on common axes. Again, performance is evaluated for the hard 710, moderate 720 and easy 730 difficulties respectively.

In the remaining experiments, the performance of the proposed detector on the moderate and easy difficulty levels is focussed upon. Referring back to FIG. 6, requiring any detection system to reliably detect car instances belonging to the hard but not moderate difficulty level (ie instances such as 602, 604 and 606) without incurring a large number of false detections is beyond the reach of the embodiment being described.

For this purpose, the moderate training strategy shown in FIG. 7b (ie training on all moderate positive examples) is adequate, judging from FIG. 7d, and is followed in all experiments described hereinafter. Although less well-performing at the moderate difficulty level compared with training on all hard positive examples, this choice strikes a balance between performance and resource requirements at training (from Table 2, moderate training instances account for only 66% of the total labelled examples).

6.4 The Features

In Section 4, six features were chosen for the proposed detector. Experiments in the previous section demonstrated the effectiveness of this choice of features (see also Section 6.6 and Section 6.7 for comparative studies with other methods).

FIG. 8 tries to highlight the relative importance of the six features chosen above for the detector and plots a measure of the relative importance of each feature in the car detection task being described. In the plot 800, features are denoted by: $c_l$, the linear shape factor 810, $c_p$, the planar shape factor 820, $c_s$, the spherical shape factor 830, $\bar{I}$, the mean of reflectance values 840, $\sigma^2(I)$, the variance of reflectance values 850, and o, the binary occupancy indicator 860. Detailed feature definitions were provided in Section 4.

To compute the measure of relative feature importance, the weights of the final classifier 28 trained (ie after the 20th round of hard negative mining) on all moderate positive examples (see Section 6.3) are taken, and, for each feature, the corresponding weights at all cell locations of the detection window 232 are collated. The feature's relative importance is then computed as the mean absolute value of these weights.

FIG. 8 suggests that the most useful features for car detection are the appearance features 840, 850. The shape features 810, 820, 830 have similar relative importance values, although the linear shape factor 810 has a lower importance value than the planar 820 and spherical 830 shape factors. The skilled person will see that the lower importance value of the linear shape 810 factor makes sense intuitively, because, by definition, the three shape factors 810, 820, 830 always sum to one. For given values of the other two shape factors 820, 830, the linear shape factor 810 is therefore redundant. The same analysis could be used for any of the shape factors 810, 820, 830—the three numbers only have two degrees of freedom, therefore knowing two shape factors allows the value of the third to be calculated. As such, any one of the three shape factors can be redundant.

To confirm the insights gained by studying FIG. 8, the detector was trained with different feature selections, again on all moderate positive examples in the training dataset for up to 20 rounds of hard negative mining. Precision-Recall curves 910, 920 of these different variants of the detector are plotted in FIG. 9 for the moderate 910 and easy 920 difficulty levels. Each Precision-Recall curve is generated with the final trained classifier 28 (ie after the 20th round of hard negative mining), evaluated on the test dataset. The lowest line 912, 922 on the plots 910, 920 is for the binary occupancy feature 860 only.

As FIG. 9 suggests, without the linear shape factor feature (lines 918, 928), the detector performs equally well compared with the original variant of using all the features (lines 916, 926). The pairs of lines 918, 916 and 928, 926 in each graph 910, 920 overlap very closely at the scale shown. Removing the appearance features 840, 850, however, greatly degrades detection performance, as shown by lines 914 and 924, confirming their dominating importance noted from FIG. 8. Finally, as a sanity check, the feature set is reduced to its bare minimum taking only the simplest binary occupancy feature 860 (see lines 912, 922). Although using only this simple feature decreases the system performance significantly compared with the full feature set, its performance is still reasonable in its own right. This demonstrates the power of the proposed approach for 3D object detection.

6.5 Timing

Empirical analysis of the computational efficiency of the proposed detector is presented below from a practical perspective.

In the embodiment being described, the proposed detector is implemented as a C++ library. Note that the computation for each orientation bin (see Section 1) is completely independent of that for the other bins, N, therefore it falls within the "embarrassingly parallelisable" paradigm. Thus, in the embodiment being described, the computation for each orientation bin is taken as an independent job unit, which may be executed on different threads of a CPU or GPU.

In what follows, the timing aspects of the implementation being described are evaluated on a MacBook Pro™ equipped with a quad-core 2 GHz Intel i7 CPU and 8 GB of RAM. The classifier 28 trained with the full feature set on all moderate positive examples is taken as the base classifier. The detection threshold is selected as the threshold value that gives the highest Recall while maintaining a Precision of over 0.9. The threshold can therefore be obtained from the Precision-Recall curve evaluated on the test dataset at the easy difficulty level 704b.

To ensure that the analysis is not biased (as the detection threshold selected this way is based on the test dataset), all results quoted, except where otherwise stated, are obtained on third independent sequence data from the KITTI dataset that are completely unlabelled, containing 1170 frames of Velodyne laser scans.

FIG. 10a shows 102a the computation time taken per frame of complete Velodyne scan from the independent sequence data (each scan contains about 100,000 points) versus frame number. Also shown on common axes is a similar plot 104a restricting the range of detection to 50 m. In both cases, the mean computation time per frame is given by a horizontal line.

FIG. 10b arranges the same information as FIG. 10a as a histogram plot to examine its distribution. The distributions of computation time per frame of the two variants (with 104b, or without 104a range limit) under comparison.

As can be noted from FIG. 10a, the time taken by the detector is highly dependent on the scene structure. This is expected as both feature computation and voting depend on the number of occupied cells 212 of the feature grid 230. Cluttered scenes tend to take longer to process. Nonetheless, each frame takes at most a second to process and on average only 618 ms, demonstrating the feasibility of the approach used for the detector to object detection in full 3D.

Although the quoted maximum range of the Velodyne HDL-64E sensor (http://www.velodynelidar.com/lidar/hdl-products/hdl64e.aspx) is as far as up to 120 m (depending on surface reflectivity), in practice the useful information is contained only within a range of about 80 m. Additionally, measurements at long ranges are so sparse due to the range-bearing nature of the device that reliable object detection at long ranges is more challenging.

By restricting the detection range, embodiments can focus upon the (relatively) close-range objects whose detection is more reliable, with an additional gain of computational speed. There is a balance to be reached, however. If the detection range is too short, too few data can be obtained and the detection performance decreases.

As such, at least some embodiments may set a range-cap. The advantage of a range limit is highlighted with reference to FIG. 10c where a plot of performance degradation as the detection range is gradually reduced is presented (by running the detector on only the laser points that fall within range).

FIG. 10c shows a plot of performance on the test dataset as the range limit decreases, evaluated at all three difficulty levels. Horizontal lines 122, 124, 126 denote performance with no range limit evaluated at the hard, moderate and easy difficulty levels respectively.

Here, performance is measured by the area under the curve (AUC) computed over the full Precision-Recall curve generated on the test dataset by varying the detection threshold as before, but now restricting detection to a given range. If the x-axis were extended to the full 120 m range, it would be seen that there is no significant difference between the AUC values at 120 m and at 80 m. Compared with the AUC without range limit (ie using the full range of 120 m), there is no notable difference to system performance down to 50 m, then the performance evaluated according to the hard difficulty starts to drop. The performance on the easy difficulty level, on the other hand, does not degrade until as close as 30 m, which is believed to be due to sparse sampling when observed at long distances.

With this observation in mind, the timing performance plotted (on the same sequence data) when the detection range is restricted to 50 m on common axes with the original timing results of the case without range limit in FIG. 10a and FIG. 10b can be evaluated. The computation speed of the detector is improved, averaging to 482 ms corresponding to an achievable processing rate of 2 Hz (e.g. with buffering).

Finally, FIG. 10d visualises the contributions of major components to the total computation time per frame as a pie chart. The majority of processing time is spent on voting, while a small proportion is spent in the computation of the feature grid. Non-maximum suppression takes the thinnest slice contributing to only 1.25% of the total time.

The pie chart of FIG. 10d shows a decomposition of computation time per frame into the major system components. The data used were evaluated on the independent sequence data with a limited detection range of 50 m; ie discounting sensor data from points further away than 50 m. The time quoted for each component is the time taken for that component per frame, averaged over the sequence.

6.6 Comparison with the Segmentation-Based Approach

In this section, the detector proposed is quantitatively compared to the segmentation-based detector described in the paper of Wang, Posner and Newman. The intention is to gain insights into how the approach to object detection in 3D described herein compares with the segmentation-based approach that is popular among state of the art 3D detection methods.

To ensure a fair comparison with the existing results quoted in the paper of Wang, Posner and Newman, care is taken to follow exactly the same evaluation procedure and use the same evaluation dataset on which results presented in Section B of the paper of Wang, Posner and Newman were obtained. In particular, each oriented object box 242 as output from the detector is converted to a corresponding object segment by taking all points that fall within the oriented object box 242.

FIG. 11 presents the Precision-Recall curve 152 of the detector evaluated in this way, compared with the results quoted in Table II of the paper of Wang, Posner and Newman on the car class for the three different detection schemes proposed for the segmentation-based detector 154. The variant of the detector evaluated is the one trained with the full feature set on all moderate positive examples from the training set (from KITTI).

As may be noted from FIG. 11, the detector described herein outperforms the segmentation-based detector by a significant margin.

As the segmentation-based detector is purely shape-based, it does not use appearance information from the reflectance values. To compare the two approaches on a common footing, the Precision-Recall curve of the variant with only the shape-based features from our feature set is also included in FIG. 11, also evaluated on the same dataset as the segmentation-based detector, line 156. Although the performance compares less favourably as compared to using the full feature set 152, as one would expect, it still outperforms the segmentation-based detector 154.

FIG. 11 shows a third comparison against the baseline detector performance to highlight that the performance is due to the detector as opposed to the training data used to train the detector. Thus, the line 158 shows the Precision-Recall curve for the simplest possible feature—the binary occupancy feature.

Despite the use of only the simplest possible feature, the detector described herein still outperforms the segmentation-based detector with its sophisticated feature set (see Section IV of the paper of Wang, Posner and Newman). This is accredited to the rich description brought by the feature grid 230 representation unique to sliding window approaches, where an object is represented by, instead of a single feature vector, features extracted at different cell locations of the detection window 232, together with the knowledge of their relative positions. Even a feature as simple as the binary occupancy indicator 160, 158 can be useful in describing an object 202.

Finally, it is noted that the comparative studies in this section are actually biased in favour of the segmentation-based detector. The classes "van" and "car" are treated separately in the KITTI dataset, thus the trained detector will not trigger on a van. However, the object labels in the dataset of the segmentation-based detector do not make this distinction, making the performance of the detector evaluated on this dataset an underestimate.

6.7 A Practical Comparison with State of the Art Vision Methods

In this section, a qualitative comparison to the reported performance of state of the art vision methods to car detection is provided. FIG. 12 shows the published results of the top five car detectors on the KITTI object detection vision benchmarking website (http://www.cvlibs.net/datasets/kitti/eval_object.php). FIG. 12 may be directly compared to FIG. 7d which shows the performance of the detector described herein.

Although quantitative results for each case are displayed in FIG. 12, any quantitative comparison between the proposed detector and the image-based detectors is not meaningful because the evaluations are not based on common criteria. Specifically, the published results of vision-based methods are evaluated according to the original difficulty specification defined with respect to vision, whereas the results quoted in FIG. 12 for the proposed detector is evaluated according to the laser-based difficulty specification defined in Section 6.2. However, because of the inherent difference in sensor modality, attempting to compare laser-based and vision-based methods on a completely fair basis is difficult. For example, what is difficult to identify by appearance in vision may not be difficult to identify from laser data, and vice versa. Evaluating the performance of one sensor modality on a set of evaluation criteria designed for fair comparison for another sensor modality cannot lead to meaningful results.

However, it is possible to qualitatively compare the performance of the proposed detector with the published results of current state of the art vision methods from a practical point of view. In both cases, the division to the easy, moderate and hard difficulty levels reflects what a human perceiver would find challenging or straight-forward to perceive by observation of data form the sensor modality alone (either laser or vision). Thus, a qualitative comparison is meaningful because the Precision and Recall metrics in both cases evaluate how the respective detection system performs at achieving the perception task at a common indicative level of proficiency. Hence it may be noted from FIG. 12 in conjunction with FIG. 7d that, from a practical point of view, the proposed detector is commensurate at the task of car detection with the current best vision-based car detectors. In particular, plot 710 can be directly compared to plot 1210, 720 to 1220 and 730 to 1230.

The invention claimed is:

1. A method of detecting objects within a three-dimensional (3D) environment, comprising:
    obtaining a 3D point-cloud representation of the 3D environment, the 3D point-cloud comprising a set of point locations;
    converting the 3D point-cloud to a 3D feature grid, wherein converting the 3D point-cloud to the 3D feature grid comprises:
        i) discretising the 3D space into cells according to a grid size;
        ii) making a determination as to whether the cells contain points from the 3D point-cloud;
        iii) for each cell into which at least one point from the 3D point-cloud falls, mapping the at least one point to a feature vector; and
        iv) for each cell into which no points from the 3D point-cloud fall, mapping the cell to a zero feature vector;
    generating a detection window sized to contain an integral number of the cells of the 3D feature grid and having a set of positions which can be occupied within the 3D feature grid;
    calculating, for each of the positions within the set of positions, a detection score, by:
        casting a vote for each cell within the 3D detection window into which at least one point from the 3D point-cloud falls, wherein each vote is calculated using the feature vector of the cell and a weighting vector; and
        summing the votes, and
    determining whether each position within the set of positions contains an object of interest based on the detection score, wherein each detection window with a detection score greater than a threshold is classified as containing an object of interest.

2. The method of detecting objects of interest of claim 1 in which at least some of steps (i), (ii), (iii) and (iv) are performed concurrently and/or in a different order from that shown.

3. The method of detecting objects of interest of claim 1 wherein the weighting vector is obtained from a linear classifier trained to identify the objects of interest.

4. The method of detecting objects of interest of claim 1, wherein the feature vector is a fixed-dimensional feature vector.

5. The method of detecting objects of interest of claim 1, wherein a vote for a cell is the scalar product of the feature vector of that cell and the weighting vector.

6. The method of detecting objects of interest of claim 1 further comprising compiling a set of accepted detection window locations from the detection windows calculated to contain an object of interest using the detection scores and overlap of the detection windows.

7. The method of detecting objects of claim 1 further comprising discretising the full 360° around the vertical axis into N orientation bins, rotating the point-cloud for each orientation bin, and implementing the detection process for each orientation bin.

8. The method of detecting objects of interest of claim 1, further comprising selecting a size for the 3D detection window based on a known scale of objects of interest.

9. The method of detecting objects of interest of claim 1, wherein the 3D point-cloud further comprises at least one of the following for each point:
    (i) a reflectance value; and
    (ii) colour information.

10. A system for detecting objects within a three-dimensional (3D) environment, the system comprising processing circuitry arranged to:
    obtain a 3D point-cloud representation of the 3D environment, the 3D point-cloud comprising a set of point locations;
    convert the 3D point-cloud to a 3D feature grid, wherein converting the 3D point-cloud to the 3D feature grid comprises:
        i) discretising the 3D space into cells according to a grid size;
        ii) making a determination as to whether the cells contain points from the 3D point-cloud;
        iii) for each cell into which at least one point from the 3D point-cloud falls, mapping the at least one point to a feature vector; and
        iv) for each cell into which no points from the 3D point-cloud fall, mapping the cell to a zero feature vector;

generate a detection window sized to contain an integral number of the cells of the 3D feature grid and having a set of positions which can be occupied within the 3D feature grid;

calculate, for each of the positions within the set of positions, a detection score, by:
  casting a vote for each cell within the 3D detection window into which at least one point from the 3D point-cloud falls, wherein each vote is calculated using the feature vector of the cell and a weighting vector; and
  summing the votes, and determine whether each position within the set of positions contains an object of interest based on the detection score, wherein each detection window with a detection score greater than a threshold is classified as containing an object of interest.

11. The system of claim 10, further comprising a sensor around which the 3D environment is located.

12. The system of claim 11 wherein the sensor generates the 3D point-cloud representation of the 3D environment.

13. The system of claim 11 wherein the sensor is a LIDAR system.

14. The system of claim 10, further comprising at least one of the following:
  (i) a storage device arranged to store at least one of the 3D point cloud, the 3D feature grid and results from calculations;
  (ii) a server arranged to communicate with the processing circuitry.

15. The system of claim 10, further comprising a vehicle on which the sensor and at least some of the processing circuitry is mounted.

16. The system of claim 15 wherein the system comprises a vehicle-based portion and a remote portion, and wherein the system is arranged to transfer data between the vehicle-based portion and the remote portion.

17. A vehicle having a sensor mounted thereon, the vehicle having a processing circuitry arranged to detect objects within a three-dimensional (3D) environment around the sensor, wherein the processing circuitry is arranged to:
  obtain a 3D point-cloud representation of the 3D environment, the 3D point-cloud comprising a set of point locations;
  convert the 3D point-cloud to a 3D feature grid, wherein converting the 3D point-cloud to the 3D feature grid comprises:
    i) discretising the 3D space into cells according to a grid size;
    ii) making a determination as to whether the cells contain points from the 3D point-cloud;
    iii) for each cell into which at least one point from the 3D point-cloud falls, mapping the at least one point to a feature vector; and
    iv) for each cell into which no points from the 3D point-cloud fall, mapping the cell to a zero feature vector;
  generate a detection window sized to contain an integral number of the cells of the 3D feature grid and having a set of positions which can be occupied within the 3D feature grid;
  calculate, for each of the positions within the set of positions, a detection score, by:
    casting a vote for each cell within the 3D detection window into which at least one point from the 3D point-cloud falls, wherein each vote is calculated using the feature vector of the cell and a weighting vector; and
    summing the votes, and
  determine whether each position within the set of positions contains an object of interest based on the detection score, wherein each detection window with a detection score greater than a threshold is classified as containing an object of interest.

18. The vehicle of claim 17 wherein the object detection is performed in real-time as the vehicle moves.

19. The vehicle of claim 17, wherein the processing circuitry detects objects of interest in the 3D environment around the sensor as the vehicle moves.

20. A non-transitory machine readable medium containing instructions which when read by a processor cause that processor to:
  obtain a 3D point-cloud representation of the 3D environment, the 3D point-cloud comprising a set of point locations;
  convert the 3D point-cloud to a 3D feature grid, wherein converting the 3D point-cloud to the 3D feature grid comprises:
    i) discretising the 3D space into cells according to a grid size;
    ii) making a determination as to whether the cells contain points from the 3D point-cloud;
    iii) for each cell into which at least one point from the 3D point-cloud falls, mapping the at least one point to a feature vector; and
    iv) for each cell into which no points from the 3D point-cloud fall, mapping the cell to a zero feature vector;
  generate a detection window sized to contain an integral number of the cells of the 3D feature grid and having a set of positions which can be occupied within the 3D feature grid;
  calculate, for each of the positions within the set of positions, a detection score, by:
    casting a vote for each cell within the 3D detection window into which at least one point from the 3D point-cloud falls, wherein each vote is calculated using the feature vector of the cell and a weighting vector; and
    summing the votes, and
  determine whether each position within the set of positions contains an object of interest based on the detection score, wherein each detection window with a detection score greater than a threshold is classified as containing an object of interest.

* * * * *

UNITED STATES PATENT AND TRADEMARK OFFICE
CERTIFICATE OF CORRECTION

PATENT NO. : 10,354,406 B2
APPLICATION NO. : 15/568728
DATED : July 16, 2019
INVENTOR(S) : Ingmar Posner et al.

Page 1 of 1

It is certified that error appears in the above-identified patent and that said Letters Patent is hereby corrected as shown below:

On the Title Page

On page 2, Column 1, item (56), other publications, Line 9, delete "Disciminatively" and insert --Discriminatively--, therefor.

On page 2, Column 2, item (56), other publications, Line 22, delete "detectin" and insert --detecting--, therefor.

In the Specification

In Column 13, Line 19, delete "the" and insert --The--, therefor.

In Column 14, Line 64, delete "$\mathbb{Z}^2$:" and insert --$\mathbb{Z}^3$:--, therefor.

In the Claims

In Column 28, Line 36, Claim 7, after "objects of" insert --interest of--.

Signed and Sealed this
Fifth Day of November, 2019

Andrei Iancu
*Director of the United States Patent and Trademark Office*